(12) United States Patent
Gupta et al.

(10) Patent No.: US 11,129,174 B2
(45) Date of Patent: Sep. 21, 2021

(54) USER EQUIPMENT GROUPS FOR GROUP PHYSICAL DOWNLINK CONTROL CHANNEL COMMUNICATIONS

(71) Applicant: QUALCOMM Incorporated, San Diego, CA (US)

(72) Inventors: Piyush Gupta, Bridgewater, NJ (US); Srinivas Yerramalli, San Diego, CA (US); Vinay Joseph, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 16/581,678

(22) Filed: Sep. 24, 2019

(65) Prior Publication Data

US 2020/0100263 A1    Mar. 26, 2020

Related U.S. Application Data

(60) Provisional application No. 62/736,944, filed on Sep. 26, 2018.

(51) Int. Cl.
| | | |
|---|---|---|
| *H04H 20/71* | (2008.01) | |
| *H04W 72/12* | (2009.01) | |
| *H04W 72/04* | (2009.01) | |

(52) U.S. Cl.
CPC ....... *H04W 72/121* (2013.01); *H04W 72/042* (2013.01); *H04W 72/0446* (2013.01); *H04W 72/1289* (2013.01)

(58) Field of Classification Search
CPC ........... H04W 72/121; H04W 72/0446; H04W 72/042; H04W 72/1289; H04W 4/08
(Continued)

(56) References Cited

U.S. PATENT DOCUMENTS

2016/0360553 A1    12/2016  Cheng et al.
2018/0123765 A1*   5/2018   Cao ..................... H04L 1/1822
(Continued)

FOREIGN PATENT DOCUMENTS

GB         2508595 A       6/2014
WO    WO-2013066125 A1     5/2013

OTHER PUBLICATIONS

Written Opinion of the International Searching Authority for International Application No. PCT/US2019/033816, dated Jul. 24, 2019, 7 pages.
(Continued)

*Primary Examiner* — Chuong T Ho
(74) *Attorney, Agent, or Firm* — Qualcomm Incorporated

(57) ABSTRACT

Methods, systems, and devices for wireless communication are described. A base station may transmit, and a UE may receive, via a configuration message, a group identifier indicating a group of UEs with which the UE is associated, the group of UEs being one of multiple groups of UEs which are each allocated resources. The base station may transmit the group downlink control information message to the group of UEs, and the UE may receive the group downlink control information message. The UE may determine that the group downlink control information message pertains to the UE by associating the group identifier with the group downlink control information message. The base station and the UE may communicate in accordance with the group downlink control information message based at least in part on the UE being associated with the group to which the group downlink control information message pertains.

44 Claims, 18 Drawing Sheets

(58) Field of Classification Search
USPC .......................................................... 370/312
See application file for complete search history.

(56) References Cited

U.S. PATENT DOCUMENTS

| | | | |
|---|---|---|---|
| 2018/0199359 A1* | 7/2018 | Cao | H04L 5/0094 |
| 2018/0213532 A1* | 7/2018 | Hosseini | H04L 5/0044 |
| 2018/0295651 A1* | 10/2018 | Cao | H04W 72/042 |
| 2019/0261395 A1* | 8/2019 | Goektepe | H04W 72/1263 |
| 2019/0279032 A1* | 9/2019 | Tang | G06K 9/6282 |
| 2019/0393987 A1* | 12/2019 | Hong | H04L 1/0057 |
| 2020/0100219 A1* | 3/2020 | Takeda | H04L 5/0053 |

OTHER PUBLICATIONS

U.S. Appl. No. 16/242,806, filed Jan. 8, 2019, 92 pages.
International Application No. PCT/US2019/033816, filed May 23, 2019, QUALCOMM Incorporated, 53 pages.
International Search Report and Written Opinion—PCT/US2019/052934—ISA/EPO—dated Dec. 18, 2019.
Mediatek Inc: "Discussion on Group-Common PDCCH", 3GPP TSG RAN WG1 Meeting #89, 3GPP Draft; R1-1707825 Discussion on Group-Common PDCCH_Final, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017, May 14, 2017 (May 14, 2017), pp. 1-7, XP051273026, Retrieved from the Internet: URL: http://www.3gpp.org/ftp/Meetings_3GPP_SYNC/RAN1/Docs/ [retrieved on May 14, 2017] the whole document.
Panasonic: "Reconfiguration Message Transmission Details", 3GPP TSG-RAN WG1 Meeting 74bis, 3GPP Draft; R1-134371, 3rd Generation Partnership Project (3GPP), Mobile Competence Centre; 650, Route Des Lucioles; F-06921 Sophia-Antipolis Cedex; France, vol. RAN WG1, No. Guangzhou, China; Oct. 7, 2013-Oct. 11, 2013, Sep. 27, 2013 (Sep. 27, 2013), pp. 1-5, XP050717174, Retrieved from the Internet: URL: http://www.3gpp.org/ftp/tsg_ran/WG1_RL1/TSGR1_74b/Docs/ [retrieved on Sep. 27, 2013].

* cited by examiner

USER EQUIPMENT GROUPS FOR GROUP PHYSICAL DOWNLINK CONTROL CHANNEL COMMUNICATIONS

CROSS REFERENCE

The present Application for Patent claims the benefit of U.S. Provisional Patent Application No. 62/736,944 by GUPTA et al., entitled "USER EQUIPMENT GROUPS FOR GROUP PHYSICAL DOWNLINK CONTROL CHANNEL COMMUNICATIONS," filed Sep. 26, 2018, assigned to the assignee hereof, and expressly incorporated by reference herein.

FIELD OF INVENTION

The following relates generally to wireless communication, and more specifically to user equipment groups for group physical downlink control channel communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), orthogonal frequency division multiplexing (OFDM), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, traffic may be transmitted between a base station and a UE based on a periodic schedule. Accordingly, the base station may transmit information in a downlink control channel to the UE to indicate upcoming downlink traffic or to indicate resources for upcoming uplink traffic. Some techniques may involve transmitting downlink control channel resources to each UE of a plurality of UEs in a serving cell. Transmitting this scheduling information each time the periodic traffic is identified may increase signaling overhead for the base station and UE (e.g., increased latency, overhead power consumption at the UE, etc.). Additionally, in some environments (e.g., industrial Internet of Things (I-IoT)), both control and data channels must meet stringent reliability and latency specifications. Also, in some cases, frequent updates for group assignments may occur due to factors that change channel conditions such as blockages or reflections. Frequent updates may further increase overhead burdens for the system. Some techniques used to enhance data capacity and reliability, such as current joint transmission for multiple users (CJT-MU), may not be effective due to user-grouping constraints which may affect physical downlink control channel (PDCCH) messages. Efficient techniques are desired for configuring group PDCCH transmissions while reducing signaling overhead and meeting latency and reliability specifications.

SUMMARY

The described techniques relate to improved methods, systems, devices, and apparatuses that support user equipment groups for group physical downlink control channel communications. Generally, the described techniques provide for configuring one or more user equipments (UEs) with a group identifier such that UEs sharing a same group identifier are each allocated downlink or uplink resources. Multiple groups of UEs may be organized, such that a group identifier pertains to a group within a plurality of groups of UEs that are each allocated downlink or uplink resources. For example, to reduce signaling overhead, a base station may transmit a configuration where a plurality of UEs are placed into one or more groups. The groups may be assigned such that the UEs associated with a particular group share similar channel conditions, modulation and coding scheme (MCS) specifications, etc. Once organized into groups, the UEs may be signaled of, for example, a change in their configuration via a group downlink control information (DCI) message associated with the group identifier. The group DCI may indicate resources for one or more UEs that are affiliated with the group. Based on receiving and decoding the group DCI with the group identifier, a UE may use resources indicated by the group DCI to communicate with the base station. This may include the base station transmitting and receiving respective semi-persistent scheduling (SPS) messages using resources corresponding to each UE. Accordingly, forming UE groups for group physical downlink control channel (PDCCH) messages may provide a more efficient mechanism for a base station to allocate downlink and uplink resources to a plurality of UEs while maintaining high reliability and latency specifications.

A method of wireless communication at a UE is described. The method may include receiving, via a configuration message, a group identifier indicating a group of UEs with which the UE is associated, the group of UEs being one of multiple groups of UEs which are each allocated resources, receiving, from a base station, a group downlink control information message, determining that the group downlink control information message pertains to the UE by associating the group identifier with the group downlink control information message, and communicating with the base station in accordance with the group downlink control information message based on the UE being associated with the group to which the group downlink control information message pertains.

An apparatus for wireless communication at a UE is described. The apparatus may include a processor, memory in electronic communication with the processor, and instructions stored in the memory. The instructions may be executable by the processor to cause the apparatus to receive, via a configuration message, a group identifier indicating a group of UEs with which the UE is associated, the group of UEs being one of multiple groups of UEs which are each allocated resources, receive, from a base station, a group downlink control information message, determine that the group downlink control information message pertains to the UE by associating the group identifier with the group downlink control information message, and communicate with the base station in accordance with the group downlink control information message based on the UE being associated with the group to which the group downlink control information message pertains.

Another apparatus for wireless communication at a UE is described. The apparatus may include means for receiving, via a configuration message, a group identifier indicating a group of UEs with which the UE is associated, the group of UEs being one of multiple groups of UEs which are each allocated resources, receiving, from a base station, a group downlink control information message, determining that the group downlink control information message pertains to the UE by associating the group identifier with the group downlink control information message, and communicating with the base station in accordance with the group downlink control information message based on the UE being associated with the group to which the group downlink control information message pertains.

A non-transitory computer-readable medium storing code for wireless communication at a UE is described. The code may include instructions executable by a processor to receive, via a configuration message, a group identifier indicating a group of UEs with which the UE is associated, the group of UEs being one of multiple groups of UEs which are each allocated resources, receive, from a base station, a group downlink control information message, determine that the group downlink control information message pertains to the UE by associating the group identifier with the group downlink control information message, and communicate with the base station in accordance with the group downlink control information message based on the UE being associated with the group to which the group downlink control information message pertains.

In some examples of the method, apparatuses, and non-transitory computer-readable medium described herein, the multiple groups of UEs may each be allocated the resources based on aggregation levels associated with UEs included in the multiple groups of UEs.

In some examples of the method, apparatuses, and non-transitory computer-readable medium described herein, the group downlink control information message may include multiplexed UE-specific information for one or more of UEs within the group of UEs.

Some examples of the method, apparatuses, and non-transitory computer-readable medium described herein may further include operations, features, means, or instructions for receiving, via the configuration message, a UE identifier associated with the UE, where the UE identifier may be based on either a number of UEs in the group of UEs or a number of UEs in a cell serving the group of UEs.

In some examples of the method, apparatuses, and non-transitory computer-readable medium described herein, receiving the group identifier may include operations, features, means, or instructions for receiving, via the configuration message, a set of group identifiers, each of the set of group identifiers being associated with different types of resource allocations that could be included in the group downlink control information message.

In some examples of the method, apparatuses, and non-transitory computer-readable medium described herein, determining that the group downlink control information message pertains to the UE may include operations, features, means, or instructions for determining that a cyclic redundancy check (CRC) value of the group downlink control information message may be encoded by the group identifier.

Some examples of the method, apparatuses, and non-transitory computer-readable medium described herein may further include operations, features, means, or instructions for receiving one or more unicast downlink control information messages pertaining to the UE when the UE may be no longer associated with the group and before the UE may be associated with a new group of UEs.

Some examples of the method, apparatuses, and non-transitory computer-readable medium described herein may further include operations, features, means, or instructions for receiving an additional configuration message that includes a new group identifier indicating a new group of UEs with which the UE may be associated.

Some examples of the method, apparatuses, and non-transitory computer-readable medium described herein may further include operations, features, means, or instructions for receiving a media access control (MAC) control element (CE) message that indicates a new group identifier, the new group identifier indicating a new group of UEs with which the UE may be associated.

Some examples of the method, apparatuses, and non-transitory computer-readable medium described herein may further include operations, features, means, or instructions for receiving a set of additional group identifiers in either the configuration message or an additional configuration message and receiving an additional downlink control information message that indicates that the UE may be associated with a new group identifier of the additional group identifiers.

In some examples of the method, apparatuses, and non-transitory computer-readable medium described herein, the additional downlink control information message allocates resources during a same time slot for a group of UEs indicated by the new group identifier.

Some examples of the method, apparatuses, and non-transitory computer-readable medium described herein may further include operations, features, means, or instructions for receiving a second additional downlink control information message associated with the new group identifier, where the additional downlink control information message allocates resources during a time slot for a subset of a group of UEs indicated by the new group identifier, and where the second additional downlink control information message allocates resources during a second time slot for a second subset of the group of UEs indicated by the new group identifier.

Some examples of the method, apparatuses, and non-transitory computer-readable medium described herein may further include operations, features, means, or instructions for receiving a unicast downlink control information message pertaining to the UE instead of a group downlink control information message when a number of UEs within the group of UEs to receive updated downlink control information is below a threshold.

In some examples of the method, apparatuses, and non-transitory computer-readable medium described herein, the threshold may be a based on a size of the group downlink control information message divided by a size of an individual downlink control information message.

In some examples of the method, apparatuses, and non-transitory computer-readable medium described herein, the group of UEs may be grouped by the group identifier based on each of the UEs of the group of UEs sharing a common aggregation level for individual downlink control information messages.

Some examples of the method, apparatuses, and non-transitory computer-readable medium described herein may further include operations, features, means, or instructions where other UEs may be grouped by corresponding other group identifiers, with only one group per common aggregation level.

Some examples of the method, apparatuses, and non-transitory computer-readable medium described herein may further include operations, features, means, or instructions where other UEs may be grouped in the multiple groups by corresponding other group identifiers, with one or more groups per common aggregation level, where groups associated with a same common aggregation level may be differentiated by being associated with different modulation and coding schemes.

In some examples of the method, apparatuses, and non-transitory computer-readable medium described herein, the group of UEs may be grouped by the group identifier based on downlink channel conditions, a number of the multiple groups of UEs, a timing of semi-persistent scheduled (SPS) updates for each UE, or combinations thereof.

In some examples of the method, apparatuses, and non-transitory computer-readable medium described herein, the group identifier may be a group radio network temporary identifier (G-RNTI).

In some examples of the method, apparatuses, and non-transitory computer-readable medium described herein, the configuration message may be a radio resource control (RRC) message.

A method of wireless communication at a base station is described. The method may include transmitting, via a configuration message, a group identifier indicating a group of UEs with which a UE is associated, the group of UEs being one of multiple groups of UEs which are each allocated resources, encoding at least a part of a group downlink control information message with the group identifier, transmitting the group downlink control information message to the group of UEs, and communicating with the UE in accordance with the group downlink control information message based on the UE being associated with the group to which the group downlink control information message pertains.

An apparatus for wireless communication at a base station is described. The apparatus may include a processor, memory in electronic communication with the processor, and instructions stored in the memory. The instructions may be executable by the processor to cause the apparatus to transmit, via a configuration message, a group identifier indicating a group of UEs with which a UE is associated, the group of UEs being one of multiple groups of UEs which are each allocated resources, encode at least a part of a group downlink control information message with the group identifier, transmit the group downlink control information message to the group of UEs, and communicate with the UE in accordance with the group downlink control information message based on the UE being associated with the group to which the group downlink control information message pertains.

Another apparatus for wireless communication at a base station is described. The apparatus may include means for transmitting, via a configuration message, a group identifier indicating a group of UEs with which a UE is associated, the group of UEs being one of multiple groups of UEs which are each allocated resources, encoding at least a part of a group downlink control information message with the group identifier, transmitting the group downlink control information message to the group of UEs, and communicating with the UE in accordance with the group downlink control information message based on the UE being associated with the group to which the group downlink control information message pertains.

A non-transitory computer-readable medium storing code for wireless communication at a base station is described. The code may include instructions executable by a processor to transmit, via a configuration message, a group identifier indicating a group of UEs with which a UE is associated, the group of UEs being one of multiple groups of UEs which are each allocated resources, encode at least a part of a group downlink control information message with the group identifier, transmit the group downlink control information message to the group of UEs, and communicate with the UE in accordance with the group downlink control information message based on the UE being associated with the group to which the group downlink control information message pertains.

In some examples of the method, apparatuses, and non-transitory computer-readable medium described herein, the multiple groups of UEs may each be allocated the resources based on aggregation levels associated with UEs included in the multiple groups of UEs.

In some examples of the method, apparatuses, and non-transitory computer-readable medium described herein, transmitting the group downlink control information message to the group of UEs may include including multiplexed UE-specific information for one or more of UEs within the group of UEs.

Some examples of the method, apparatuses, and non-transitory computer-readable medium described herein may further include operations, features, means, or instructions for transmitting, via the configuration message, a UE identifier associated with the UE, where the UE identifier may be based on either a number of UEs in the group of UEs or a number of UEs in a cell serving the group of UEs.

In some examples of the method, apparatuses, and non-transitory computer-readable medium described herein, transmitting the group identifier may include operations, features, means, or instructions for transmitting, via the configuration message, a set of group identifiers, each of the set of group identifiers being associated with different types of resource allocations that could be included in the group downlink control information message.

In some examples of the method, apparatuses, and non-transitory computer-readable medium described herein, encoding at least a part of the group downlink control information message with the group identifier may include operations, features, means, or instructions for encoding, by the group identifier, a CRC value of the group downlink control information message.

Some examples of the method, apparatuses, and non-transitory computer-readable medium described herein may further include operations, features, means, or instructions for transmitting one or more unicast downlink control information messages pertaining to the UE when the UE may be no longer associated with the group and before the UE may be associated with a new group of UEs.

Some examples of the method, apparatuses, and non-transitory computer-readable medium described herein may further include operations, features, means, or instructions for transmitting an additional configuration message that includes a new group identifier indicating a new group of UEs with which the UE may be associated.

Some examples of the method, apparatuses, and non-transitory computer-readable medium described herein may further include operations, features, means, or instructions for transmitting a MAC CE message that indicates a new group identifier, the new group identifier indicating a new group of UEs with which the UE may be associated.

Some examples of the method, apparatuses, and non-transitory computer-readable medium described herein may further include operations, features, means, or instructions for transmitting a set of additional group identifiers in either the configuration message or an additional configuration message and transmitting an additional downlink control information message that indicates that the UE may be associated with a new group identifier of the additional group identifiers.

In some examples of the method, apparatuses, and non-transitory computer-readable medium described herein, the additional downlink control information message allocates resources during a same time slot for a group of UEs indicated by the new group identifier.

Some examples of the method, apparatuses, and non-transitory computer-readable medium described herein may further include operations, features, means, or instructions for transmitting a second additional downlink control information message associated with the new group identifier, where the additional downlink control information message allocates resources during a time slot for a subset of a group of UEs indicated by the new group identifier, and where the second additional downlink control information message allocates resources during a second time slot for a second subset of the group of UEs indicated by the new group identifier.

Some examples of the method, apparatuses, and non-transitory computer-readable medium described herein may further include operations, features, means, or instructions for transmitting a unicast downlink control information message pertaining to the UE instead of a group downlink control information message when a number of UEs within the group of UEs to receive updated downlink control information is below a threshold.

In some examples of the method, apparatuses, and non-transitory computer-readable medium described herein, the threshold may be a based on a size of the group downlink control information message divided by a size of an individual downlink control information message.

In some examples of the method, apparatuses, and non-transitory computer-readable medium described herein, the group of UEs may be grouped by the group identifier based on each of the UEs of the group of UEs sharing a common aggregation level for individual downlink control information messages.

Some examples of the method, apparatuses, and non-transitory computer-readable medium described herein may further include operations, features, means, or instructions where other UEs may be grouped by corresponding other group identifiers, with only one group per common aggregation level.

Some examples of the method, apparatuses, and non-transitory computer-readable medium described herein may further include operations, features, means, or instructions where other UEs may be grouped in the multiple groups by corresponding other group identifiers, with one or more groups per common aggregation level, where groups associated with a same common aggregation level may be differentiated by being associated with different modulation and coding schemes.

In some examples of the method, apparatuses, and non-transitory computer-readable medium described herein, the group of UEs may be grouped by the group identifier based on downlink channel conditions, a number of the multiple groups of UEs, a timing of SPS updates for each UE, or combinations thereof.

In some examples of the method, apparatuses, and non-transitory computer-readable medium described herein, the group identifier may be a G-RNTI.

In some examples of the method, apparatuses, and non-transitory computer-readable medium described herein, the configuration message may be an RRC message.

DETAILED DESCRIPTION

Figure 1:
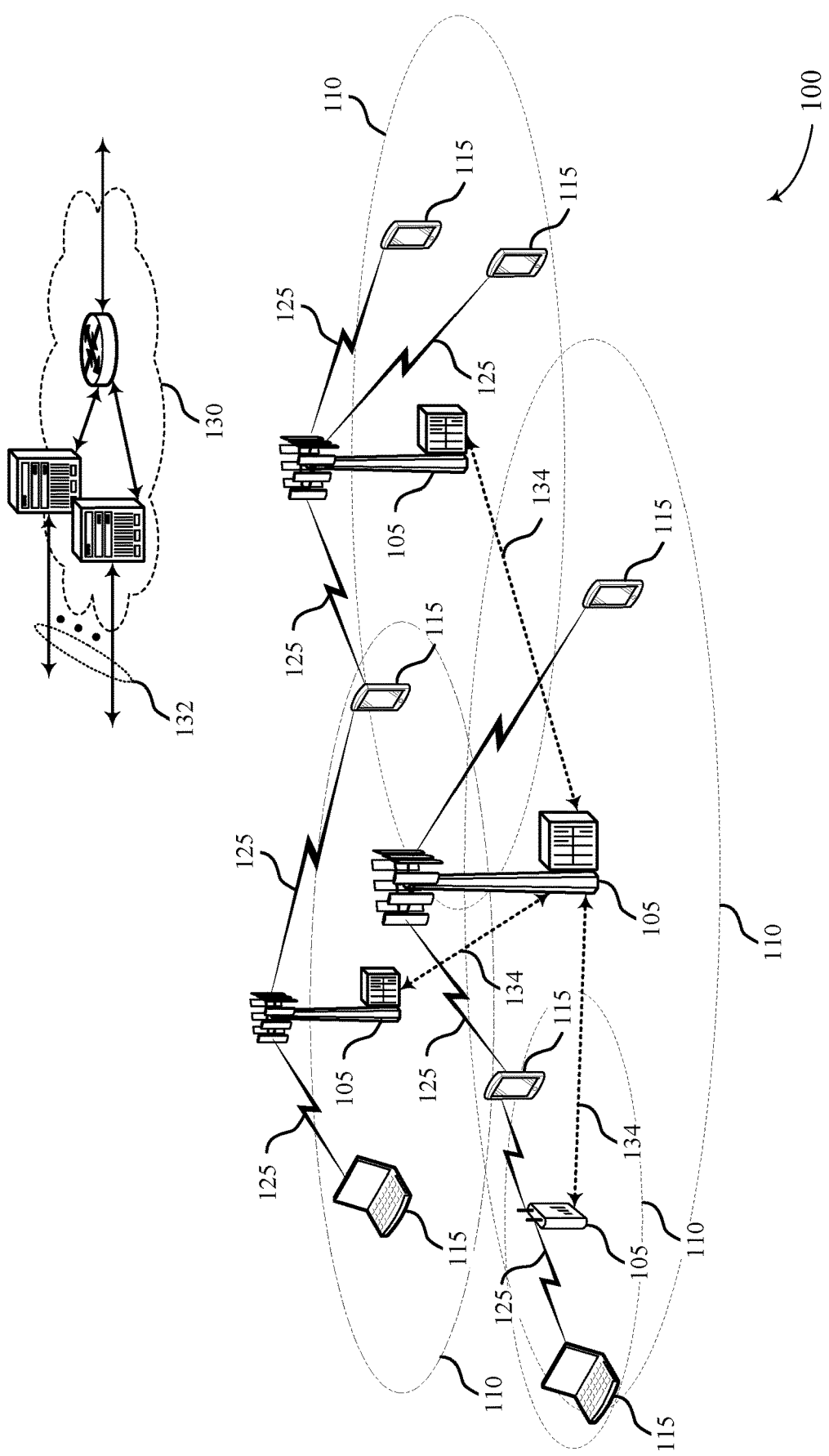
FIG. 1 illustrates an example of a wireless communications system that supports user equipment groups for group physical downlink control channel communications in accordance with aspects of the present disclosure.

In some wireless communications systems, a base station and a user equipment (UE) may communicate periodically.

For example, factory automation settings may involve carrying periodic traffic between a programmable logic controller (PLC) and a sensor-plus-actuator (S/A) (e.g., via communications between a base station and a UE). The periodic wireless traffic communicated within a factory automation setting may be subject to strict latency and reliability specifications. Rather than sending dynamic grants each time the periodic traffic is present, which may include large signaling overhead which may be detrimental to latency specifications, the base station may configure a semi-persistent scheduling (SPS) scheme to schedule resources semi-statically that may be used for the periodic traffic. Some SPS scenarios may include a base station communicating with a large number of UEs or the UEs communicating directly with each other. In these examples, sending individual grant messages may result in a large control signal overhead to convey downlink and uplink resources to each UE.

Through configuration protocols, such as a radio resource control (RRC) protocol, a base station may transmit a group identifier which indicates a UE's association to a particular UE group. The base station may group one or more UEs into a UE group based on a number of factors, including similar aggregation level or modulation and coding scheme (MCS) specifications, a correlation among UEs in the timing of their SPS updates, etc. There may be a UE group assigned to each aggregation level, there may be multiple UE groups for an aggregation level (e.g., based on different MCS specifications), or there may be a group that includes multiple aggregation levels. Grouping UEs with similar aggregation level specifications may help ensure that a group physical downlink control channel (PDCCH) may utilize fewer resources than PDCCHs sent to individual UEs. In this instance, resource utilization is improved when UEs with poor channel conditions are grouped together instead of in one UE group with UEs with good channel conditions (e.g., higher aggregation levels may provide more robust coding and reliability for UEs under poor radio frequency conditions, in exchange for additional resources).

Based on receiving a group identifier, for example, via a configuration message, a UE may then receive a group downlink control information (DCI) message from a base station. The UE may decode the group DCI with the group identifier to determine if the group DCI pertains to the UE. Because the group DCI is tailored to a particular UE group including a subset of UEs with similar characteristics instead of one single UE group for all UEs in a particular factory automation setting (e.g., 100+ UEs), the aggregate payload for multiple group DCIs may utilize fewer resources than a DCI for the single group or unicast DCIs for all the UEs. Based on determining that a UE belongs to a particular UE group, the UE may communicate with the base station in accordance with the resources indicated by the group DCI message.

Aspects of the disclosure are initially described in the context of a wireless communications system. Additional wireless communications systems, a periodic traffic transmission, and a process flow are then provided to describe aspects of the disclosure. Aspects of the disclosure are further illustrated by and described with reference to apparatus diagrams, system diagrams, and flowcharts that relate to user equipment groups for group physical downlink control channel communications.

FIG. 1 illustrates an example of a wireless communications system 100 that supports user equipment groups for group physical downlink control channel communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Media Access Control (MAC) layer, or Medium Access Control layer, may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (e.g., the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems may support ultra-reliable low-latency communication (URLLC) services. As the name suggests, URLLC may be characterized by low latency and high reliability specifications (e.g., ≤1 ms latency and ≥99.9999% reliability). In some cases, the URLLC services may further include periodic traffic transmitted between a base station 105 and a UE 115. For example, in factory automation URLLC use cases, uplink and downlink periodic transmissions may be sent between a PLC (e.g., via a base station 105) and an S/A (e.g., a UE 115). This periodic traffic may occur at set time periods based on a configured periodicity. In some aspects, periodic traffic may not be limited to URLLC services and may be utilized for services where data is regularly transmitted between a base station 105 and a UE 115 at set time intervals (e.g., periodically). In some cases, a base station 105 may include a large number of UEs 115 that are connected to it. For example, the factory automation URLLC use cases may involve a high user density (e.g., one UE 115 per square meter), resulting in a large number of UEs 115 per base station 105. As such, if a PDCCH is utilized for signaling the periodic traffic for each data transmission (e.g., downlink and uplink transmissions), a bottleneck may occur where there are too many PDCCHs to transmit at a given time for the base station 105, and the base station 105 may not be able to handle all of the periodic traffic. For example, sending downlink grants (i.e., sending one DCI per slot) to each UE 115 may result in a large PDCCH overhead (e.g., signaling overhead) for the base station 105.

Accordingly, a base station 105 may transmit a group identifier which indicates a group of UEs 115 (of a plurality of groups of UEs 115) to which a particular UE 115 may be associated. The base station 105 may encode a group downlink control information message with the group identifier and then transmit the group downlink control information message to a plurality of UEs 115. The base station 105 may then communicate with a UE 115 in accordance with the group downlink control information message based at least in part on the UE 115 being associated with the group to which the group downlink control information message pertains.

Similarly, one or more UEs 115 may receive a group identifier which indicates a group of UEs 115 (of a plurality of groups of UEs 115) to which the one or more UEs 115 may be associated. The one or more UEs 115 may receive a group downlink control information message from a base station 105. Based on determining that a group identifier of a UE 115 is associated with the group downlink control information message, the particular UE 115 may then communicate with the base station 105 in accordance with the group downlink control information message.

Figure 2:
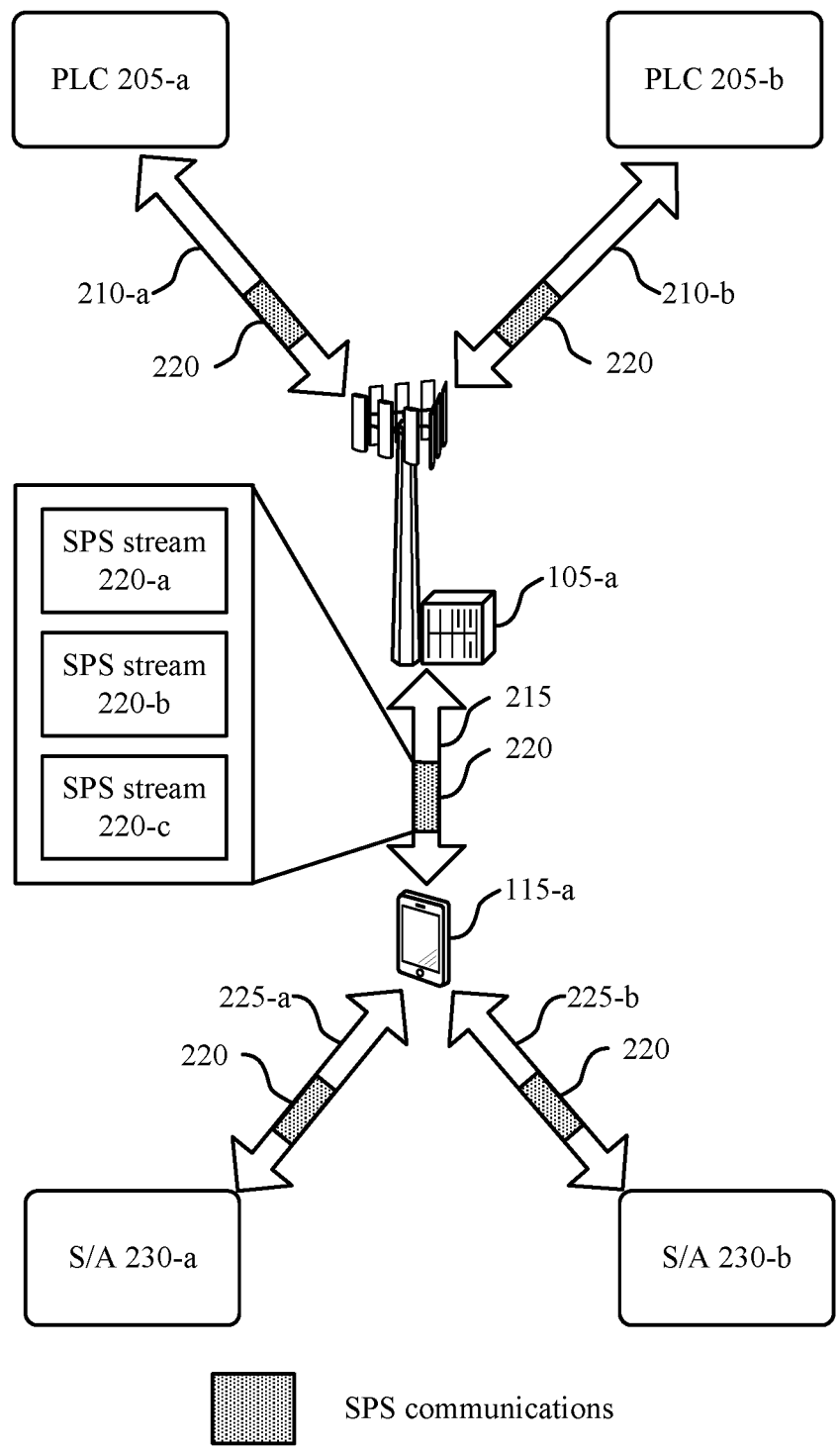
FIG. 2 illustrates an example of a wireless communications system that supports user equipment groups for group physical downlink control channel communications in accordance with aspects of the present disclosure.

FIG. 2 illustrates an example of a wireless communications system 200 that supports user equipment groups for group physical downlink control channel communications in accordance with aspects of the present disclosure. In some examples, wireless communications system 200 may implement aspects of wireless communication system 100. Wireless communications system 200 may include a base station 105-a and a UE 115-a, which may be examples of base stations 105 and UEs 115, respectively, as described herein with reference to FIG. 1.

PLCs 205-*a* and 205-*b* may be communicating with S/As 230 using one or more SPS streams 220. The periodic transmissions made in accordance with an SPS stream 220 may be referred to as a set of SPS transmissions. Each of the streams 220 may be transmitted from a PLC 205 to an S/A 230 via base station 105-*a* and UE 115-*a*. For example, a periodic downlink or uplink transmission for an SPS stream 220 may be transmitted from a PLC 205 to the base station 105-*a* via a connection 210 (e.g., a wired connection). The base station 105-*a* may transmit the downlink transmission of SPS stream 220-*a* to UE 115-*a* via connection 215 (e.g., a wireless connection). The UE 115-*a* may in turn transmit the downlink transmission of SPS stream 220-*a* to the appropriate S/A 230 via connection 225 (e.g., a wired connection). Here, a single UE 115-*a* may be configured to transmit multiple SPS streams 220 (e.g., SPS stream 220-*a*, SPS stream 220-*b*, and SPS stream 220-*c*). In an example, UE 115-*a* may be connected with more than one S/A (e.g., S/A 230-*a* and S/A 230-*b*) or UE 115-*a* may be connected to an S/A 230 with more than one SPS streams 220 (e.g., S/A 230-*a* may communicate with PLC 205-*a* via SPS streams 220-*a* and 220-*b*).

Each of the SPS streams 220 may be configured with specific transmission parameters. In some cases, the UE 115-*a* may initially be configured with the transmission parameters via RRC signaling or a combination of RRC signaling and DCI messaging (e.g., RRC signals the configuration and DCI activates the configuration). The transmission parameters may include a bandwidth indication (e.g., a number of RBs for the SPS transmissions within SPS streams 220) or an MCS (e.g., data rate) for the SPS streams 220. Additionally or alternatively, each of the SPS streams 220 may have transmission parameters such as a periodicity for transmission, a time offset, or a frequency offset.

In some examples, the communications in wireless communications system 200 may result in a large control signal overhead for grant messages conveying downlink and uplink resources to a UE. Transmitting scheduling information each time SPS transmissions are identified may increase signaling overhead for the base station 105-*a* and UE 115-*a* (e.g., increased latency, overhead power consumption at the UE, etc.). To reduce the signaling overhead, a base station may transmit a configuration where a plurality of UEs are placed into one or more groups. Through, for example, the RRC signaling, base station 115-*a* may transmit a group identifier which indicates UE's 115-*a* association to a particular UE group. Based on receiving a group identifier, UE 115-*a* may then receive a group downlink control information message from a base station. UE 115-*a* may decode the group DCI with the group identifier to determine if the group DCI pertains to UE 115-*a*. Based on determining that UE 115-*a* belongs to a particular UE group, UE 115-*a* may communicate with base station 105-*a* in accordance with the resources indicated by group downlink control information message.

When utilizing group physical downlink control channel communications, base station 105-*a* may group one or more UEs such that the UEs of the group share similar characteristics such as channel conditions, aggregation level, MCS, etc. Grouping UEs in this manner and providing control information to the group as a whole may allow for a more efficient and lower latency system than the case if each UE were provided its own resources or if all UEs in a serving cell were provided resources in a single group control information message.

Figure 3:
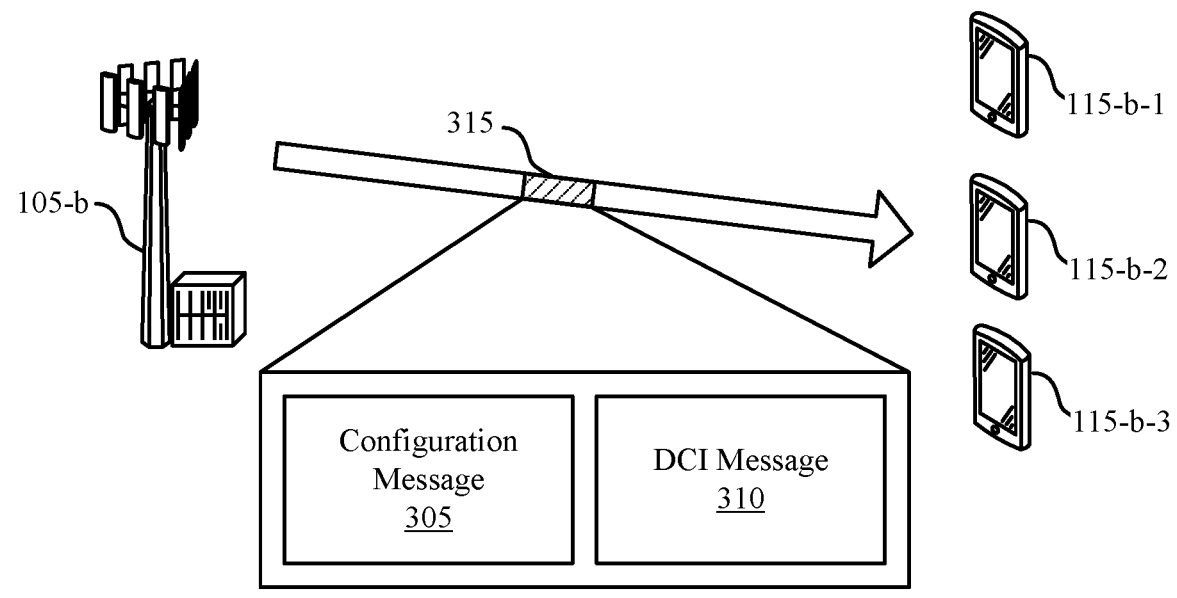
FIG. 3 illustrates an example of a wireless communications system that supports user equipment groups for group physical downlink control channel communications in accordance with aspects of the present disclosure.

FIG. 3 illustrates an example of a wireless communications system 300 that supports user equipment groups for group physical downlink control channel communications in accordance with aspects of the present disclosure. In some examples, wireless communications system 300 may include a base station 105-*b*, UE 115-*b*-1, UE 115-*b*-2, and UE 115-*b*-3, which may be examples of base stations 105 and UEs 115, respectively, as described herein with reference to FIG. 1 and FIG. 2.

Base station 105-*b* may transmit a configuration message 305 to UE 115-*b*-1, UE 115-*b*-2, and UE 115-*b*-3 via higher layer signaling 315, such as RRC signaling. In this example, UE 115-*b*-1, UE 115-*b*-2, and UE 115-*b*-3 may represent any number of UEs within a serving cell. In some cases, configuration message 305 may be signaled to UE 115-*b*-1, UE 115-*b*-2, and UE 115-*b*-3 via a combination of RRC signaling and DCI messaging (e.g., RRC signaling provides the configuration and DCI activates the configuration). In some cases, UE 115-*b*-1, UE 115-*b*-2, and UE 115-*b*-3 may receive a group identifier in configuration message 305. The group identifier may be a group radio network temporary identifier (G-RNTI). The group identifier may be used by base station 105-*b* to scramble a CRC value of DCI message 310. In turn, UE 115-*b*-1, UE 115-*b*-2, and UE 115-*b*-3 may decode the CRC value of DCI message 310 using a received group identifier. In some examples, configuration message 305 may include a plurality of distinct group identifiers. Each of the plurality of group identifiers may each be associated with their own type of resource allocations for downlink or uplink communications between a base station and one or more UEs. In some examples, the resource allocations corresponding to each of the plurality of group identifiers may occur during a same time slot. In some examples, a group DCI may provide a resource allocation update to a subset of UEs in a group of UEs for one time slot, while a second group DCI may provide a resource allocation update to another subset of UEs in the group of UEs in a subsequent time slot. Because a DCI may be size-constrained, one group DCI may not have the capacity to update all the UEs in a group for a same time slot.

In determining which UEs are to be associated with a particular group identifier, base station 105-*b* may group together UE 115-*b*-1, UE 115-*b*-2, and UE 115-*b*-3 in the same or different groups based on various factors. For example, base station 105-*b* may group UE 115-*b*-1 and UE 115-*b*-3 together because they share a common aggregation level for individual downlink control information messages, with UE 115-*b*-1-2 being placed in another UE group (associated with a different group identifier) because it has a different aggregation level than UE 115-*b*-1 and UE 115-*b*-3. In some examples, UE 115-*b*-1-2 may be placed in a group that shares its aggregation level. In some examples, there may be one or more UE groups per common aggregation level, where each of the groups sharing a same aggregation level may have a different MCS. Other factors that may influence how a base station may place UEs into groups include downlink channel conditions, a number of the multiple groups of UEs, a timing of semi-persistent scheduled (SPS) updates for each UE, or various combinations of the above factors. In some cases, the UE 115-*b* may also receive a UE identifier in the configuration message 305. The UE identifier may be generated based on a number of UEs in a group of UEs or a number of UEs in a cell serving a group of UEs.

The DCI message 310 may be scrambled by the base station 105-*b* using a group identifier. In an example, UE 115-*b*-1, UE 115-*b*-2, and UE 115-*b*-3 may attempt to decode the DCI message 310 utilizing the same group identifier. In some examples, UE 115-*b*-1 and UE 115-*b*-3 may have been assigned the group identifier while UE 115-*b*-2 may have been assigned a different group identifier via configuration message 305. Based on receiving and decoding the DCI message 310 with the group identifier, UE 115-*b*-1 and UE 115-*b*-3 may use resources indicated by the DCI message 310 to communicate with the base station. In an example aspect, the DCI message 310 may include multiplexed UE-specific information for UE 115-*b*-1 through UE 115-*b*-3.

Figure 4:
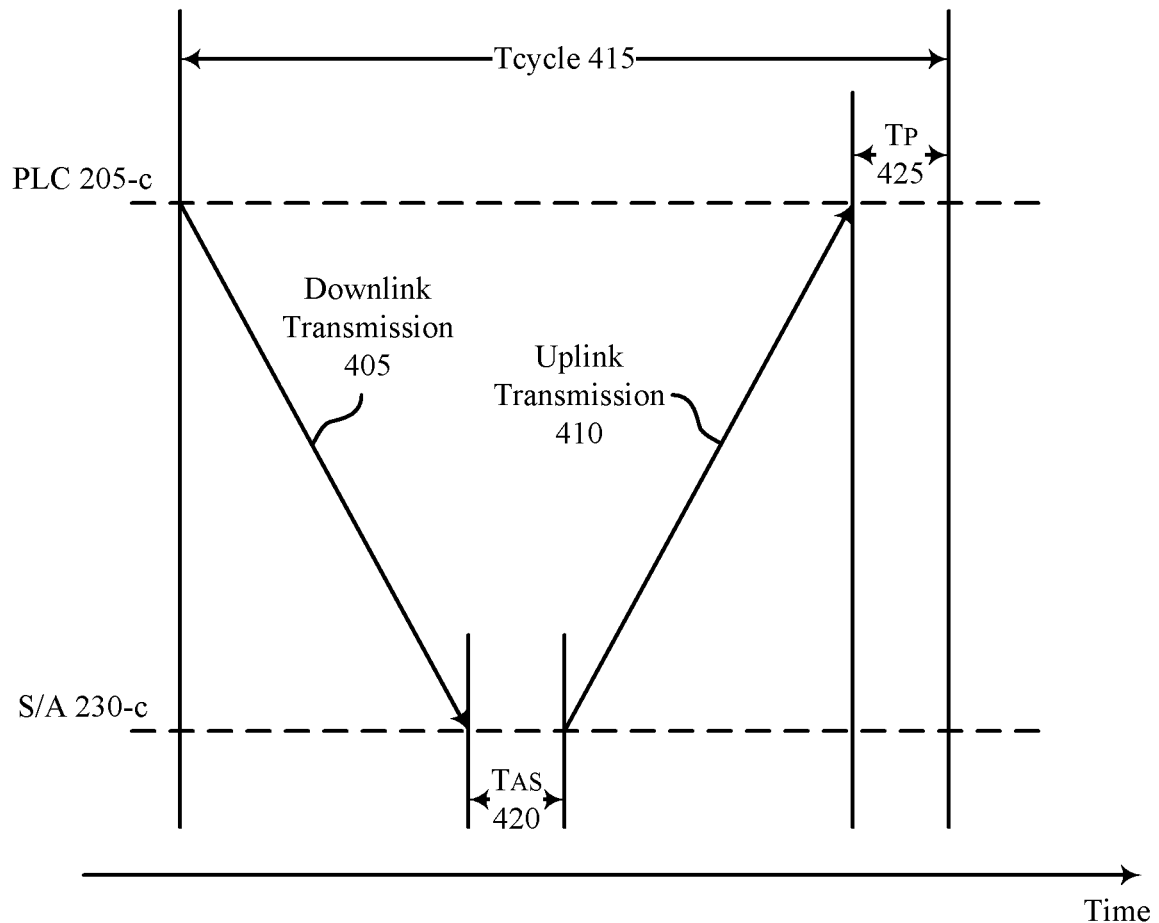
FIG. 4 illustrates an example of a periodic traffic transmission that supports user equipment groups for group physical downlink control channel communications in accordance with aspects of the present disclosure.

FIG. 4 illustrates an example of a periodic traffic transmission 400 that supports user equipment groups for group physical downlink control channel communications in accordance with aspects of the present disclosure. In some examples, periodic traffic transmission 400 may implement aspects of wireless communication system 100, 200, or 300. Periodic traffic transmission 400 may include data transmitted between a PLC 205-*c* and an S/A 230-*c* (e.g., sent between a base station 105 and a UE 115 as described herein with reference to FIGS. 1 through 3). In some aspects, PLC 205-*c* and S/A 230-*c* may be part of a factory automation URLLC use case, where metrics are transmitted from S/A 230-*c* to PLC 205-*c* within the low latency and high reliability specifications for URLLC services.

In some cases, PLC 205-*c* may send a downlink transmission 405 periodically to S/A 230-*c*. The downlink transmission 405 may request information (e.g., performance metrics) from S/A 230-*c*. Accordingly, S/A 230-*c* may send an uplink transmission 410 in response to the downlink transmission 405. Alternatively or additionally, although not shown, S/A 230-*c* may send uplink transmission 410 without receiving the downlink transmission 405 based on a configured transmission schedule for the periodic traffic. The downlink transmission 405 and the uplink transmission 410 may be sent within a cycle duration ($T_{cycle}$) 415, where $T_{cycle}$ 415 represents one period for the periodic traffic. In some aspects, an actuation and sensing duration ($T_{AS}$) 420 may occur between the downlink transmission 405 and the uplink transmission 410, where S/A 230-*c* receives the downlink transmission 405 and gathers the requested data. After receiving the uplink transmission 410, PLC 205-*c* may use a processing duration ($T_P$) 425 to process the uplink transmission 410 and receive the information from S/A 230-*c*.

As described herein, periodic traffic transmission 400 and $T_{cycle}$ 415 may represent one period of an SPS (e.g., an autonomous) transmission configuration. Accordingly, periodic traffic transmission 400 may be sent according to parameters such as a configured time offset, frequency offset, MCS, and bandwidth. Examples of aspects of periodic traffic transmission 400 may be applied to situations where a UE may use resources indicated by a group DCI message to communicate with a base station.

Figure 5A:
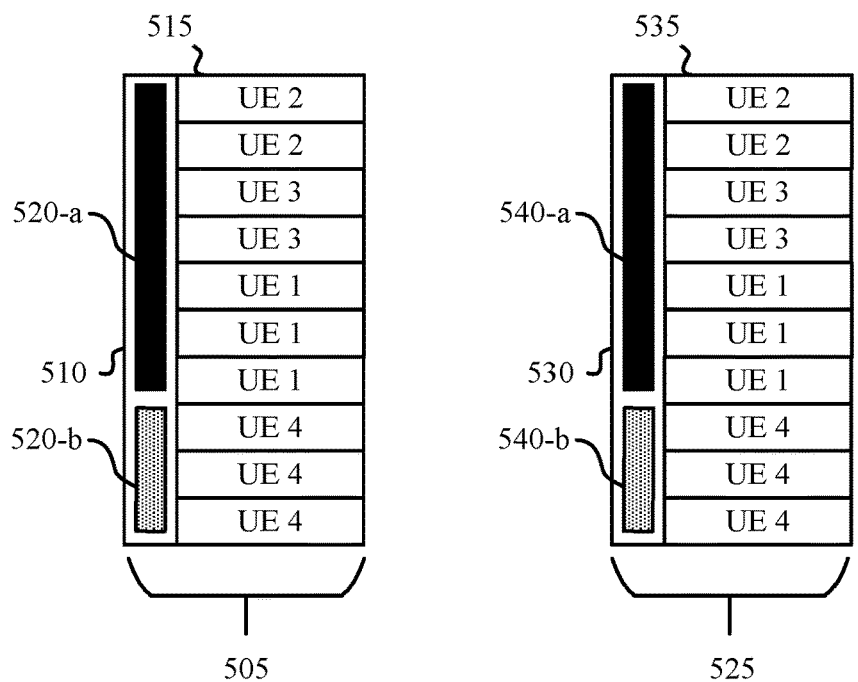
FIGS. 5A and 5B illustrate examples of frame structures that support user equipment groups for group physical downlink control channel communications in accordance with aspects of the present disclosure.

FIG. 5A illustrates an example of frame structures 500 that support user equipment groups for group physical downlink control channel communications in accordance with aspects of the present disclosure. In some examples, frame structures 500 may implement aspects of wireless communication system 100, 200, or 300. Frame structures 500 may be examples of data transmitted between a base station 105 and a UE 115 as described herein with reference to FIGS. 1 through 4.

Frame structures 500 illustrate an example of a downlink frame configuration 505 and an uplink frame configuration 525. Downlink frame configuration 505 may include a control portion 510 (e.g., PDCCH control signal) and a downlink resource configuration 515. Downlink resource configuration 515 may possess downlink data resources that correspond to particular UEs as shown. Control portion 510 may contain one or more group DCI. In this example, control portion 510 includes group DCI 520-*a* and group DCI 520-*b*. In this example, a base station may assign UEs 1, 2 and 3 to group DCI 520-*a* and UE 4 to group DCI 520-*b*. The base station may assign UEs based on a number of factors including, for example, aggregation level, downlink channel conditions, a number of the multiple groups of UEs, a timing of semi-persistent scheduled (SPS) updates for each UE, or various combinations of the above factors. For example, UEs 1, 2, and 3 may have been grouped together because they share a same aggregation level, while UE 4 may have been placed in a different group because it has a different aggregation level than UEs 1, 2, and 3. Generally, control portion 510 may carry or otherwise provide an indication of a downlink SPS trigger for the UEs. The downlink SPS trigger may activate downlink resource configuration 515 for the UEs. In this case, UEs 1, 2, and 3 may utilize their respective downlink resources to communicate with the base station based on associating a corresponding group identifier with group DCI 520-*a*. Also, UE 4 may utilize its respective downlink resources to communicate with the base station based on associating a corresponding group identifier with group DCI 520-*b*.

Uplink frame configuration 525 may include a control portion 530 (e.g., PDCCH control signal) and an uplink resource configuration 535. Uplink resource configuration 535 may possess uplink data resources that correspond to particular UEs as shown. Control portion 530 may contain one or more group DCI. In this example, control portion 530 includes group DCI 540-*a* and group DCI 540-*b*. In this example, a base station may assign UEs 1, 2 and 3 to group DCI 540-*a* and UE 4 to group DCI 540-*b*. The base station may assign UEs based on a number of factors including, for example, aggregation level, downlink channel conditions, a number of the multiple groups of UEs, a timing of semi-persistent scheduled (SPS) updates for each UE, or various combinations of the above factors. For example, UEs 1, 2, and 3 may have been grouped together because they share a same aggregation level, while UE 4 may have been placed in a different group because it has a different aggregation level than UEs 1, 2, and 3. Generally, control portion 530 may carry or otherwise provide an indication of an uplink SPS trigger for the UEs. The SPS trigger may activate uplink resource configuration 535 for the UEs. In this case, UEs 1, 2, and 3 may utilize their respective uplink resources to communicate with the base station based on associating a corresponding group identifier with group DCI 540-*a*. Also, UE 4 may utilize its respective uplink resources to communicate with the base station based on associating a corresponding group identifier with group DCI 540-*b*.

Figure 5B:
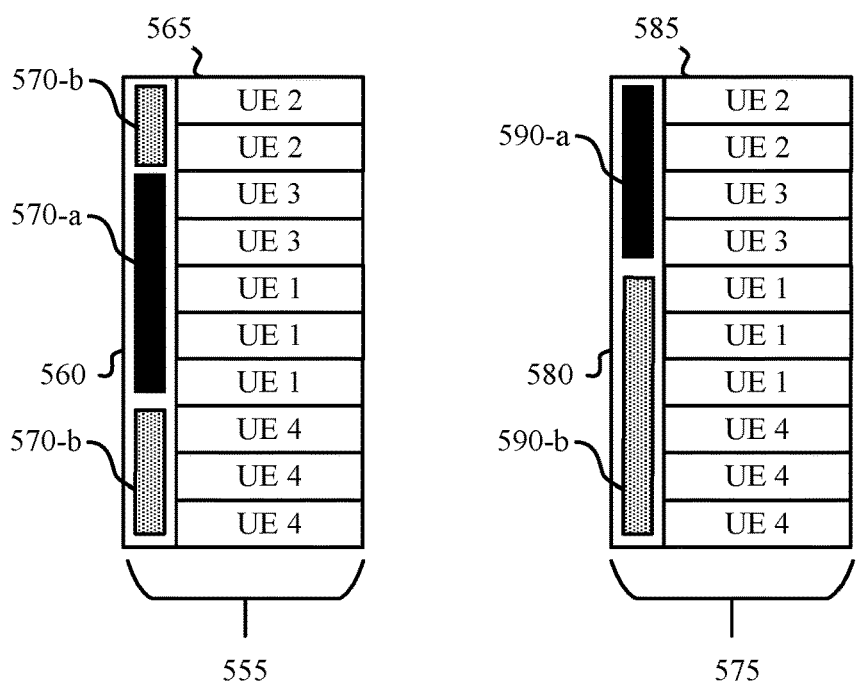

FIG. 5B illustrates an example of frame structures 550 that support user equipment groups for group physical downlink control channel communications in accordance with aspects of the present disclosure. In some examples, frame structures 550 may implement aspects of wireless communication system 100, 200, or 300. Frame structures 550 may be examples of data transmitted between a base station 105 and a UE 115 as described herein with reference to FIGS. 1 through 4.

Frame structures 550 illustrate an example of a downlink frame configuration 555 and an uplink frame configuration 575. Downlink frame configuration 555 and uplink frame configuration 575 may be examples of messages that indicate to one or more UEs that they are to be associated with a new UE group. Prior to receiving downlink frame configuration 555 and uplink frame configuration 575, UEs 1-4 may receive a plurality of additional group identifiers in an original configuration message or an additional configuration message subsequent to the original. UEs 1-4 may also receive a media access control (MAC) control element (CE) message that indicates a new group identifier for one or more of the UEs. The new group identifier may indicate a new group of UEs with which a particular UE is associated.

Downlink frame configuration 555 may include a control portion 560 (e.g., PDCCH control signal) and a downlink resource configuration 565. In this example, control portion 560 includes group DCI 570-*a* and group DCI 570-*b*. In this example, a base station may assign UEs 1 and 3 to group DCI 570-*a* and UEs 2 and 4 to group DCI 570-*b*. A base station may have changed the UE grouping (e.g., from a different frame configuration) due to a change in one of the factors described herein (e.g., different channel conditions for one or more UEs). In some cases, the UEs associated with group DCI 570-*a* may share a same aggregation level, and the UEs associated with group DCI 570-*b* may share a different aggregation level (e.g., different from the aggregation level shared by the UEs associated with group DCI 570-*a*). In some cases, the UEs of group DCI 570-*a* and group DCI 570-*b* may share a same aggregation level, but may have different MCS specifications. In this case, UEs 1 and 3 may utilize their respective downlink resources to communicate with the base station based on associating a corresponding group identifier with group DCI 570-*a*. Also, UEs 2 and 4 may utilize their respective downlink resources to communicate with the base station based on associating a corresponding group identifier with group DCI 570-*b*.

Uplink frame configuration 575 may include a control portion 580 (e.g., PDCCH control signal) and an uplink resource configuration 585. In this example, control portion 580 includes group DCI 590-*a* and group DCI 590-*b*. In this example, a base station may assign UEs 2 and 3 to group DCI 590-*a* and UEs 1 and 4 to group DCI 590-*b*. A base station may have changed the UE grouping (e.g., from a different frame configuration) due to a change in one of the factors described herein (e.g., different channel conditions for one or more UEs). In contrast with downlink frame configuration 555, a UE grouping may be different across the downlink and uplink channels for one or more UEs due to channel, power, or interference differences between the channels. In this case, UEs 2 and 3 may utilize their respective uplink resources to communicate with the base station based on associating a corresponding group identifier with group DCI 590-*a*. Also, UEs 1 and 4 may utilize its respective uplink resources to communicate with the base station based on associating a corresponding group identifier with group DCI 590-*b*.

In some cases, a UE may no longer be associated with a group to which it was originally assigned. In this example, the UE may receive one or more unicast downlink control information messages pertaining to the UE in order to communicate with the base station. In some cases, the UE may receive an additional configuration message that includes a new group identifier indicating a new group of UEs with which the UE is associated.

Figure 6:
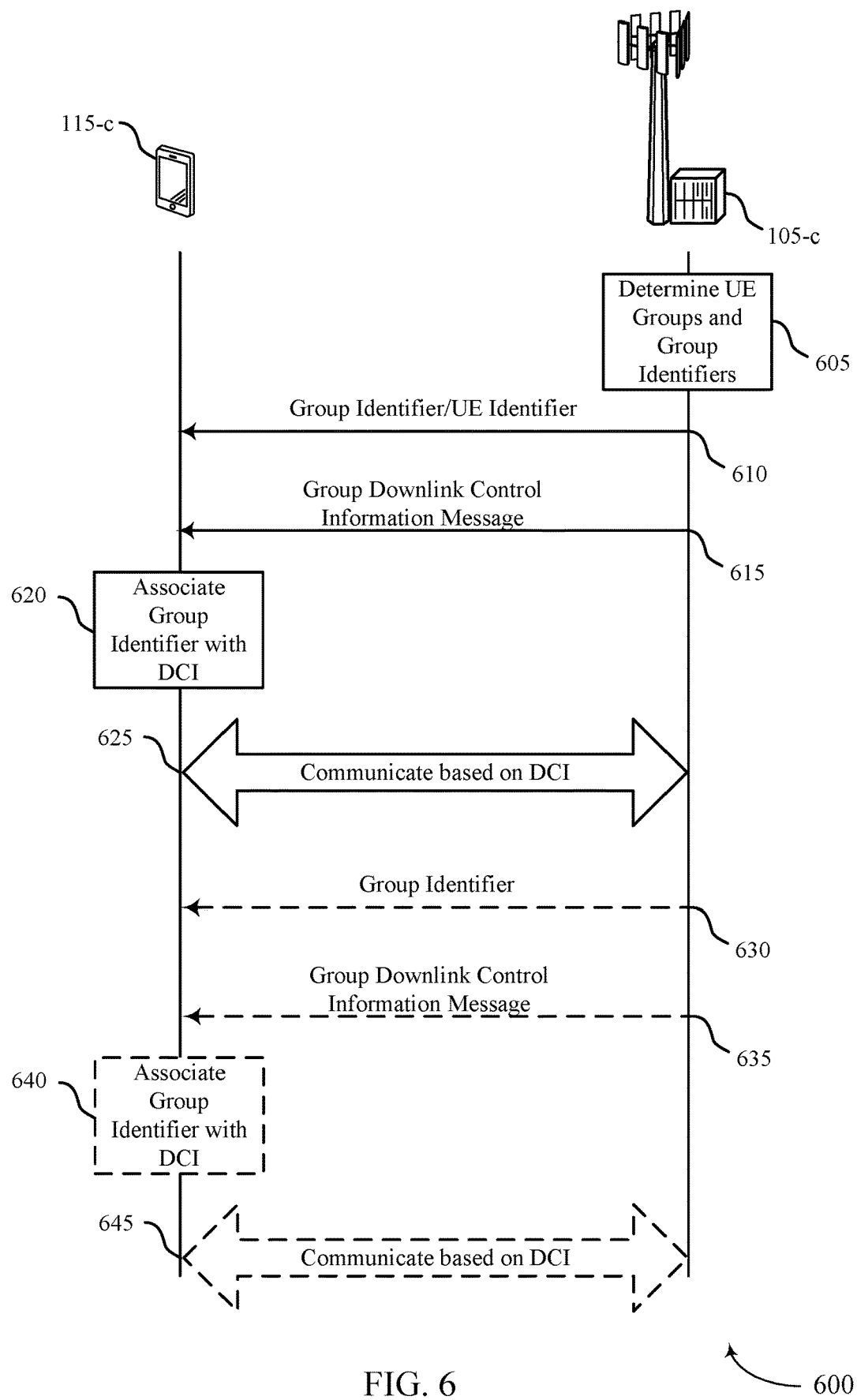
FIG. 6 illustrates an example of a process flow that supports user equipment groups for group physical downlink control channel communications in accordance with aspects of the present disclosure.

In some cases, a base station may determine that downlink control information of a number of UEs does not correspond to present channel conditions (e.g., a number of UEs may require updated downlink control information due to, for example, a change in channel conditions). In an example, if the number of UEs within a group of UEs requiring updated downlink control information is below a predetermined threshold, the base station may decide to transmit a unicast downlink control information message pertaining to the UE instead of a group downlink control information message. For example, if the base station determines downlink control information of one of the UEs within the group of UEs does not correspond to present channel conditions (e.g., one UE, for example, only one UE requires updated downlink control information), the amount of resources for transmitting a unicast downlink control information message to the UE may be less than the amount of resources for transmitting an updated group downlink control information message containing downlink control information for the group of UEs. The threshold may be determined from a size of the group downlink control information message divided by a size of an individual downlink control information message FIG. 6 illustrates an example of a process flow 600 that supports user equipment groups for group physical downlink control channel communications in accordance with aspects of the present disclosure. In some examples, process flow 600 may implement aspects of wireless communications system 100, 200, or 300. Process flow 600 may include a base station 105-*c* and a UE 115-*c*, which may be examples of a corresponding base station 105 and UE 115, respectively, as described herein with reference to FIGS. 1 through 4.

In the following description of the process flow 600, the operations between UE 115-*c* and base station 105-*c* may be performed in different orders or at different times. Some operations may also be left out of the process flow 600, or other operations may be added to the process flow 600. It is to be understood that while UE 115-*c* and base station 105-*c* are shown performing a number of the operations of process flow 600, any wireless device may perform the operations shown.

At 605, base station 105-*c* may determine multiple groups of UEs which are each allocated resources. In some aspects, the multiple groups of UEs may each be allocated the resources based on aggregation levels associated with UEs included in the multiple groups of UEs. A group identifier may be assigned to each group of the multiple groups of UEs. The group identifier may be a G-RNTI. A particular grouping may be determined based on each of the UEs of a group of UEs sharing a common aggregation level for individual downlink control information messages. In some cases, UEs are grouped by corresponding other group identifiers, with one group per common aggregation level (e.g., only one group per common aggregation level). In some cases, the group of UEs are grouped by the group identifier based on downlink channel conditions, a number of the multiple groups of UEs, a timing of SPS updates for each UE, or some combination of the factors.

At 610, UE 115-*c* may receive via a configuration message from base station 105-*c*, a group identifier indicating a group of UEs with which UE 115-*c* is associated. Additionally or alternatively, UE 115-*c* may receive via the configuration from base station 105-*c*, a UE identifier associated with the UE. The UE identifier may be based on a number of UEs in the group of UEs or a number of UEs in a cell serving the group of UEs. In some cases, UE 115-*c* may also receive via the configuration message from base station 105-*c*, a plurality of group identifiers. In this example, each of the plurality of group identifiers may be associated with different types of resource allocations that could be included in a group downlink control information message.

At 615, UE 115-*c* may receive from base station 105-*c*, a group downlink control information message. The group downlink control information message may be transmitted to the group of UEs. In some aspects, the group downlink control information message may include multiplexed UE-specific information for one or more of UEs within the group of
UEs. Base station 105-*c* may encode the group downlink control information message with the group identifier.

At 620, UE 115-*c* may determine that the group downlink control information message pertains to it (e.g., the UE grouping of UE 115-*c*) by associating the group identifier with the group downlink control information message. In an example, UE 115-*c* may determine that the group downlink control information message pertains to UE 115-*c* by determining that a CRC value of the group downlink control information message is encoded by the group identifier.

At 625, based on UE 115-*c* determining that the group downlink control information message pertains to its UE grouping, UE 115-*c* and base station 105-*c* may communicate in accordance with the group downlink control information message.

In some cases, at 630, UE 115-*c* may receive via an additional configuration message from base station 105-*c*, one or more new group identifiers indicating a new group of UEs with which UE 115-*c* is associated. In this example, base station 105-*c* may determine a change has occurred that necessitated placing UE 115-*c* in a different UE group (e.g., changing channel conditions, different aggregation level, etc.). At 635, UE 115-*c* may receive from base station 105-*c*, an additional group downlink control information message. The additional group downlink control information message may indicate that the UE is to be associated with a new group identifier of the additional group identifiers. In some examples, the resource allocations corresponding to each of the plurality of group identifiers may occur during a same time slot. In some examples, a group DCI may provide a resource allocation update to a subset of UEs in a group of UEs for one time slot, while a second group DCI may provide a resource allocation update to another subset of UEs in the group of UEs in a subsequent time slot. According to examples of aspects herein, a group DCI may update all the UEs in a group for a same time slot. In some aspects, a group DCI may update subsets of the UEs in a group during different time slots (e.g., based on capacity or size of a DCI).

At 640, UE 115-*c* may determine that the additional group downlink control information message pertains to it (e.g., the UE grouping of UE 115-*c*) by associating the new group identifier with the additional group downlink control information message. At 645, based on UE 115-*c* determining that the additional group downlink control information message pertains to its UE grouping, UE 115-*c* and base station 105-*c* may communicate in accordance with the additional group downlink control information message.

Figure 7:
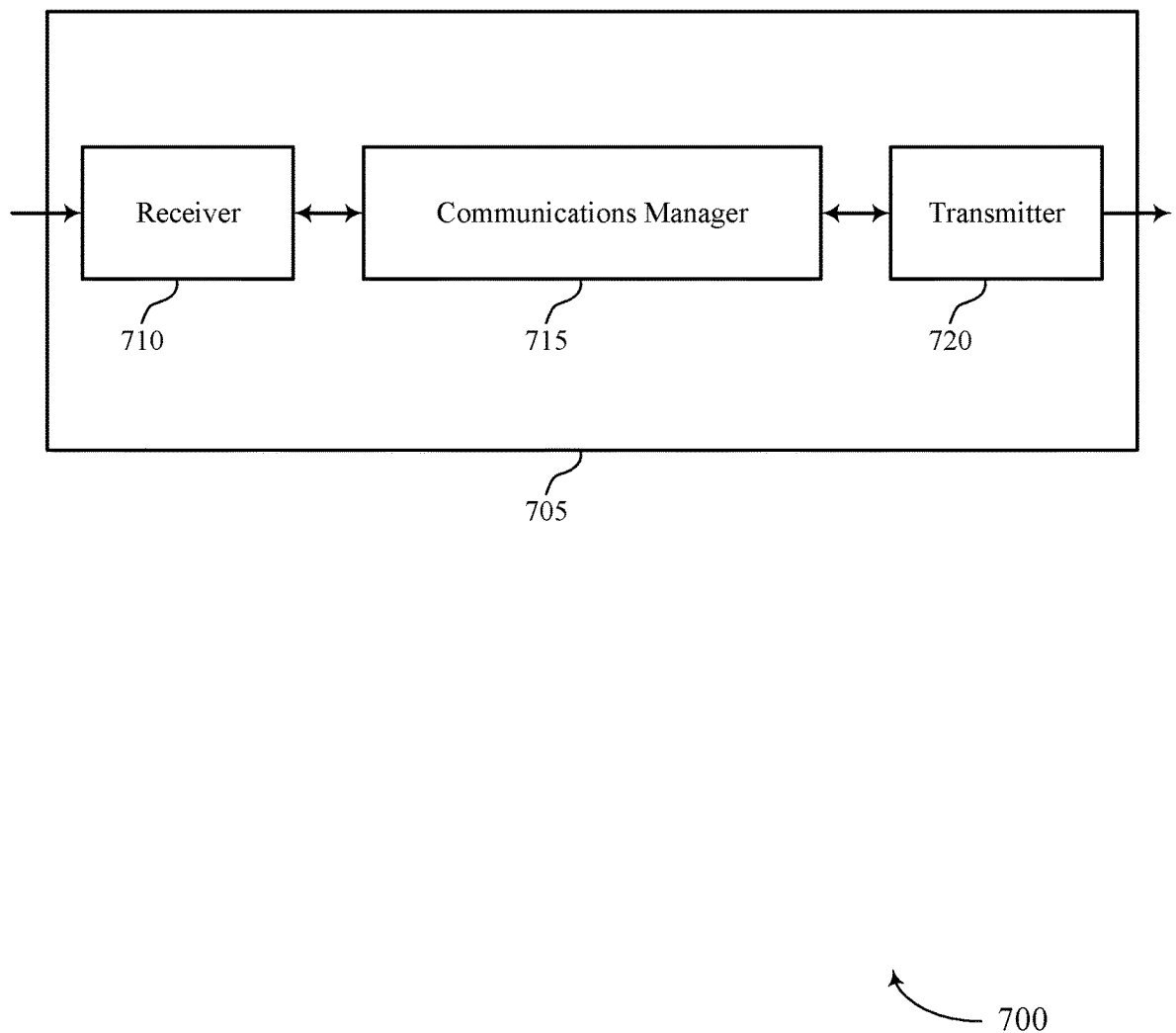
FIGS. 7 and 8 show block diagrams of devices that support user equipment groups for group physical downlink control channel communications in accordance with aspects of the present disclosure.

FIG. 7 shows a block diagram 700 of a device 705 that supports user equipment groups for group physical downlink control channel communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to user equipment groups for group physical downlink control channel communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, via a configuration message, a group identifier indicating a group of UEs with which the UE is associated, the group of UEs being one of multiple groups of UEs which are each allocated resources, and determine that the group downlink control information message pertains to the UE by associating the group identifier with the group downlink control information message. The communications manager 715 may also receive, from a base station, a group downlink control information message, and communicate with the base station in accordance with the group downlink control information message based on the UE being associated with the group to which the group downlink control information message pertains. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
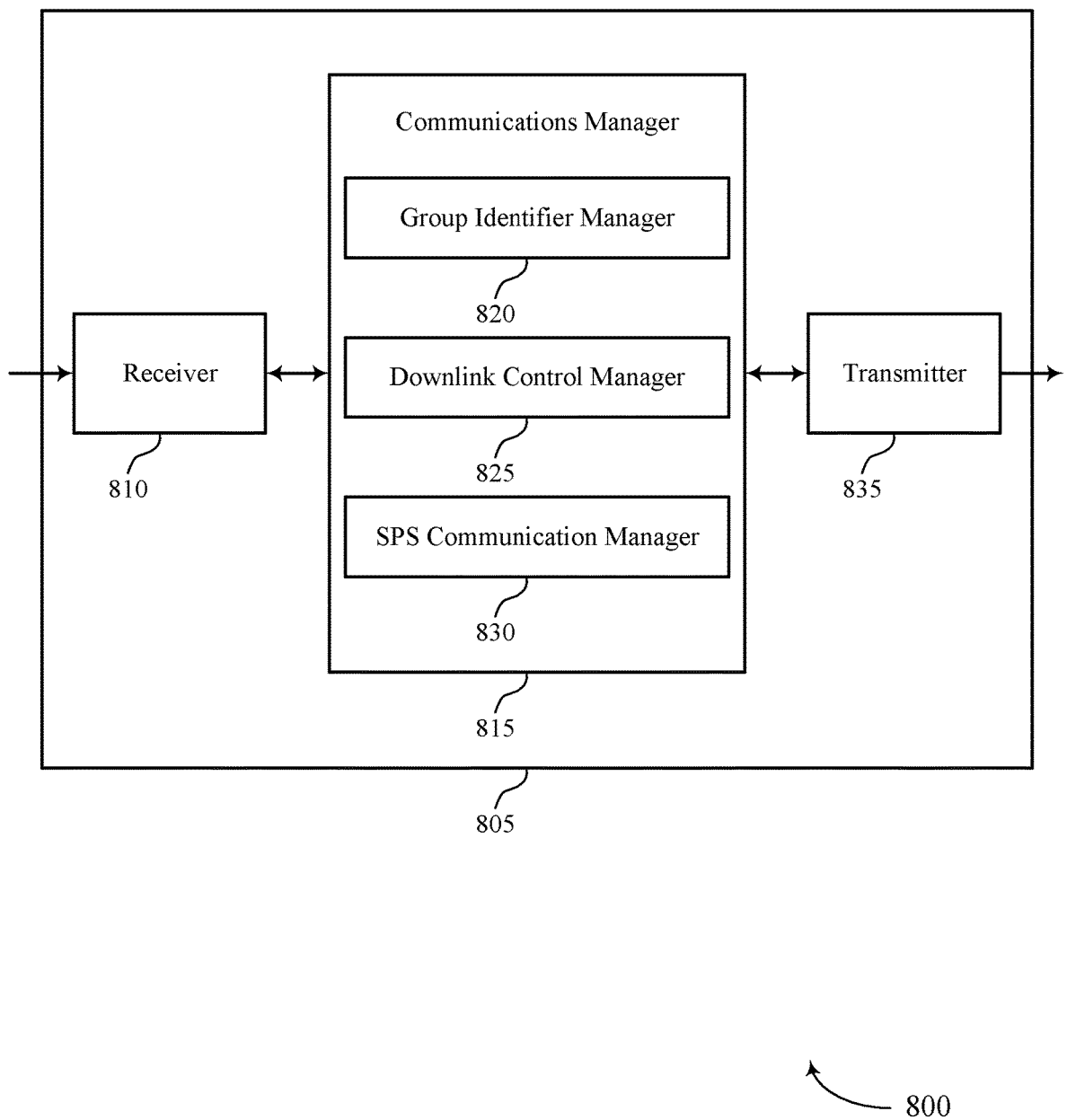

FIG. 8 shows a block diagram 800 of a device 805 that supports user equipment groups for group physical downlink control channel communications in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to user equipment groups for group physical downlink control channel communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a group identifier manager 820, a downlink control manager 825, and a SPS communication manager 830. The communications manager 815 may be an example of aspects of the communications manager 1010 described herein.

The group identifier manager 820 may receive, via a configuration message, a group identifier indicating a group of UEs with which the UE is associated, the group of UEs being one of multiple groups of UEs which are each allocated resources. The group identifier manager 820 may also determine that the group downlink control information message pertains to the UE by associating the group identifier with the group downlink control information message.

The downlink control manager 825 may receive, from a base station, a group downlink control information message.

The SPS communication manager 830 may communicate with the base station in accordance with the group downlink control information message based on the UE being associated with the group to which the group downlink control information message pertains.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
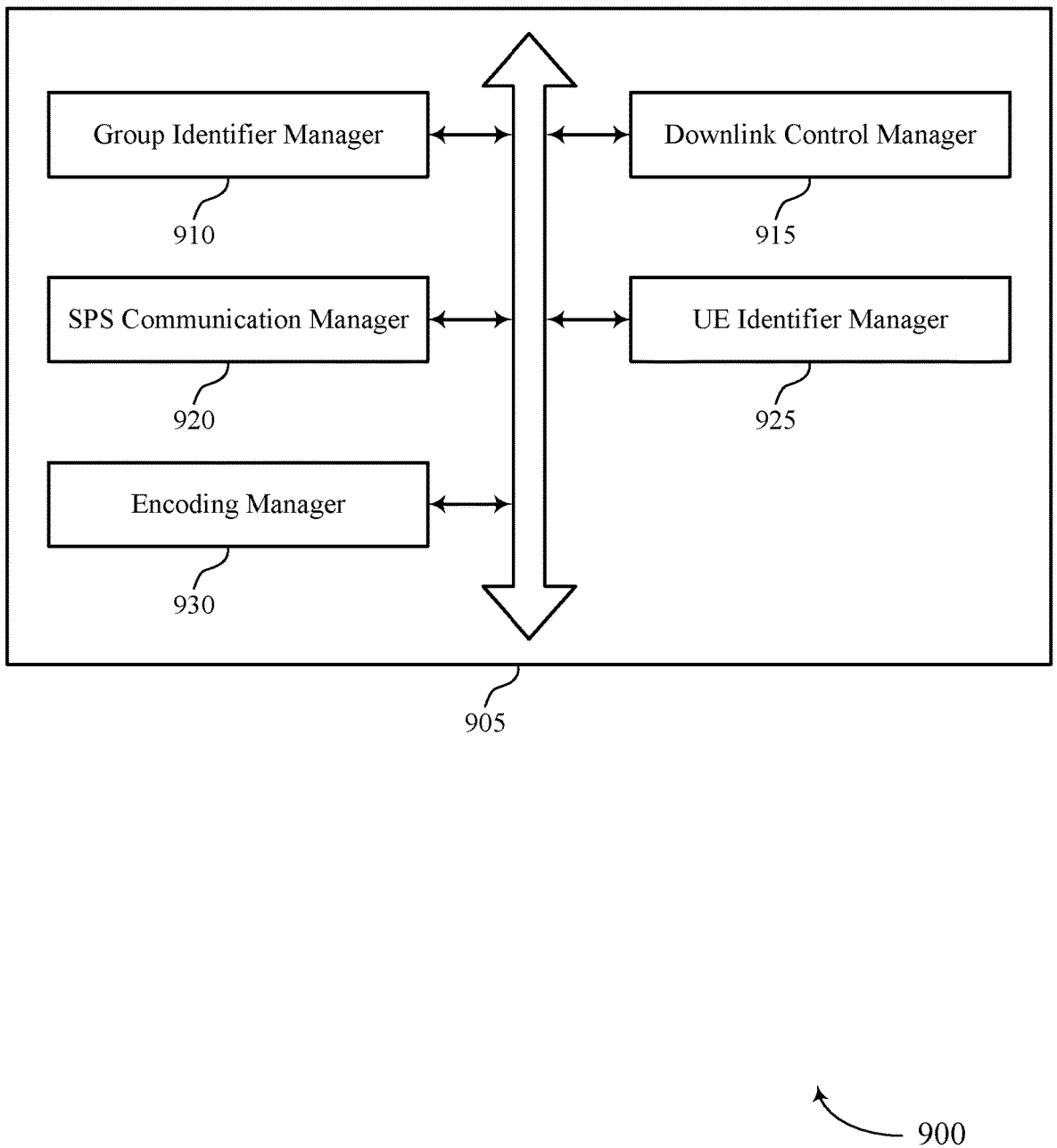
FIG. 9 shows a block diagram of a communications manager that supports user equipment groups for group physical downlink control channel communications in accordance with aspects of the present disclosure.

FIG. 9 shows a block diagram 900 of a communications manager 905 that supports user equipment groups for group physical downlink control channel communications in accordance with aspects of the present disclosure. The communications manager 905 may be an example of aspects of a communications manager 715, a communications manager 815, or a communications manager 1010 described herein. The communications manager 905 may include a group identifier manager 910, a downlink control manager 915, a SPS communication manager 920, a UE identifier manager 925, and an encoding manager 930. Each of these modules may communicate, directly or indirectly, with one another (e.g., via one or more buses).

The group identifier manager 910 may receive, via a configuration message, a group identifier indicating a group of UEs with which the UE is associated, the group of UEs being one of multiple groups of UEs which are each allocated resources.

In some examples, the group identifier manager 910 may determine that the group downlink control information message pertains to the UE by associating the group identifier with the group downlink control information message. In some examples, the group identifier manager 910 may receive, via the configuration message, a set of group identifiers, each of the set of group identifiers being associated with different types of resource allocations that could be included in the group downlink control information message.

In some examples, the group identifier manager 910 may receive an additional configuration message that includes a new group identifier indicating a new group of UEs with which the UE is associated. In some examples, the group identifier manager 910 may receive a MAC CE message that indicates a new group identifier, the new group identifier indicating a new group of UEs with which the UE is associated.

In some examples, the group identifier manager 910 may receive a set of additional group identifiers in either the configuration message or an additional configuration message. In some examples, the group identifier manager 910 may receive an additional downlink control information message that indicates that the UE is to be associated with a new group identifier of the additional group identifiers.

The downlink control manager 915 may receive, from a base station, a group downlink control information message.

In some examples, the downlink control manager 915 may receive one or more unicast downlink control information messages pertaining to the UE when the UE is no longer associated with the group and before the UE is associated with a new group of UEs.

In some examples, the downlink control manager 915 may receive a unicast downlink control information message pertaining to the UE instead of a group downlink control information message when a number of UEs within the group of UEs to receive updated downlink control information is below a threshold.

The SPS communication manager 920 may communicate with the base station in accordance with the group downlink control information message based on the UE being associated with the group to which the group downlink control information message pertains.

The UE identifier manager 925 may receive, via the configuration message, a UE identifier associated with the UE, where the UE identifier is based on either a number of UEs in the group of UEs or a number of UEs in a cell serving the group of UEs.

The encoding manager 930 may determine that a CRC value of the group downlink control information message is encoded by the group identifier.

Figure 10:
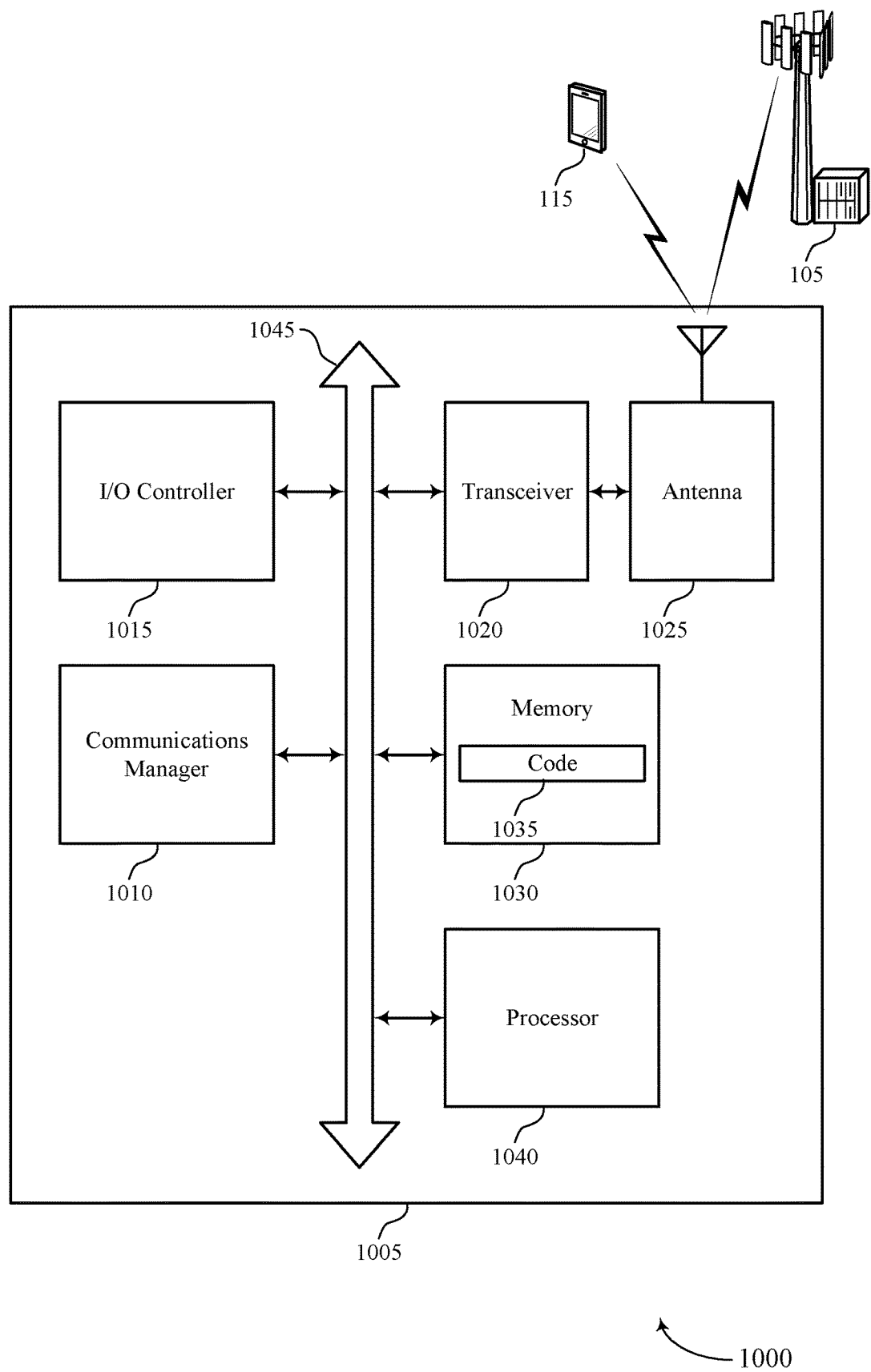
FIG. 10 shows a diagram of a system including a device that supports user equipment groups for group physical downlink control channel communications in accordance with aspects of the present disclosure.

FIG. 10 shows a diagram of a system 1000 including a device 1005 that supports user equipment groups for group physical downlink control channel communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, via a configuration message, a group identifier indicating a group of UEs with which the UE is associated, the group of UEs being one of multiple groups of UEs which are each allocated resources, and determine that the group downlink control information message pertains to the UE by associating the group identifier with the group downlink control information message. The communications manager 1010 may also receive, from a base station, a group downlink control information message, and communicate with the base station in accordance with the group downlink control information message based on the UE being associated with the group to which the group downlink control information message pertains.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting user equipment groups for group physical downlink control channel communications).

The code 1035 may include instructions to implement aspects of the present disclosure, including instructions to support wireless communication. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
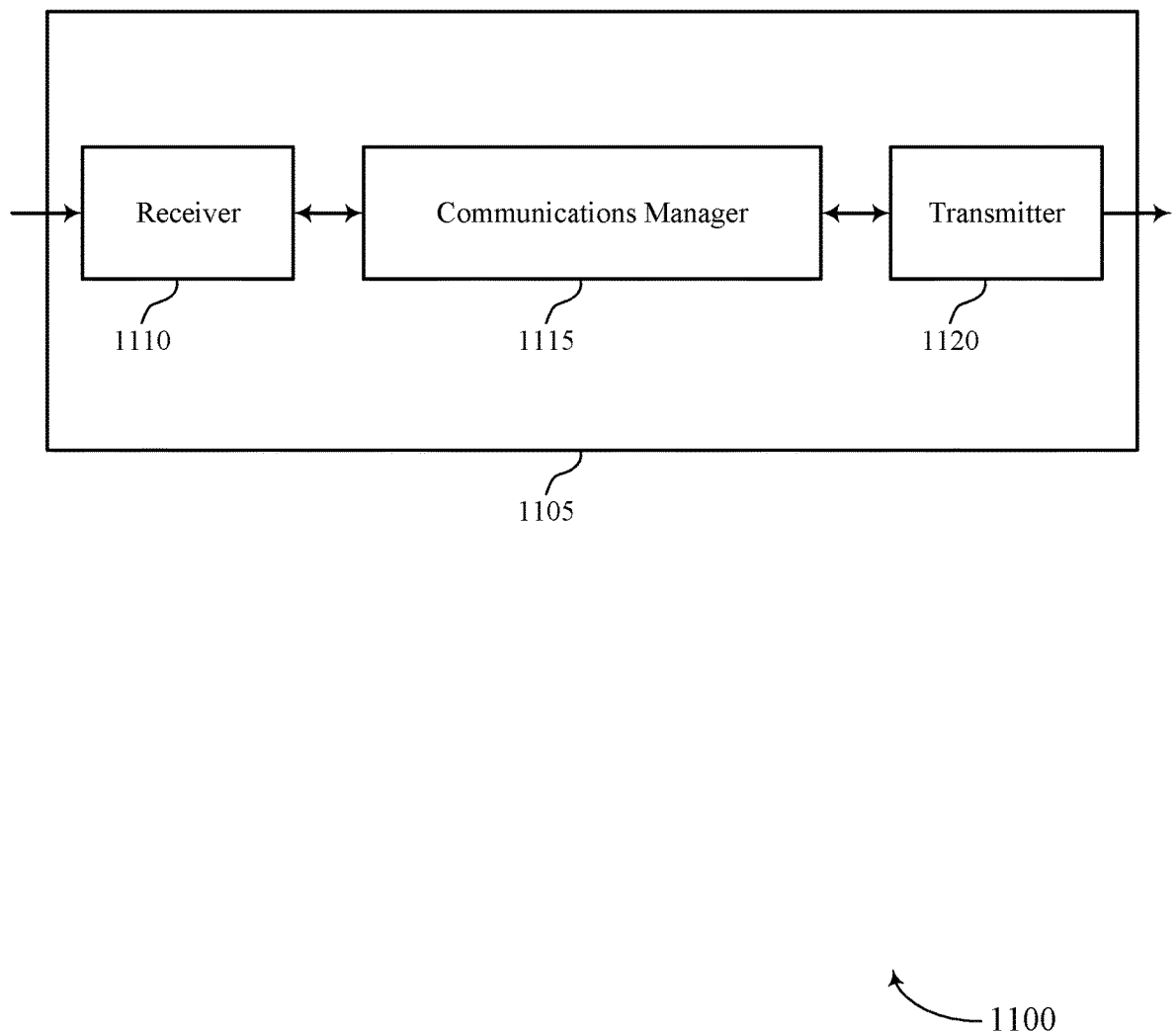
FIGS. 11 and 12 show block diagrams of devices that support user equipment groups for group physical downlink control channel communications in accordance with aspects of the present disclosure.

FIG. 11 shows a block diagram 1100 of a device 1105 that supports user equipment groups for group physical downlink control channel communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to user equipment groups for group physical downlink control channel communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, via a configuration message, a group identifier indicating a group of UEs with which a UE is associated, the group of UEs being one of multiple groups of UEs which are each allocated resources, and encode at least a part of a group downlink control information message with the group identifier. The communications manager 1115 may also transmit the group downlink control information message to the group of UEs, and communicate with the UE in accordance with the group downlink control information message based on the UE being associated with the group to which the group downlink control information message pertains. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
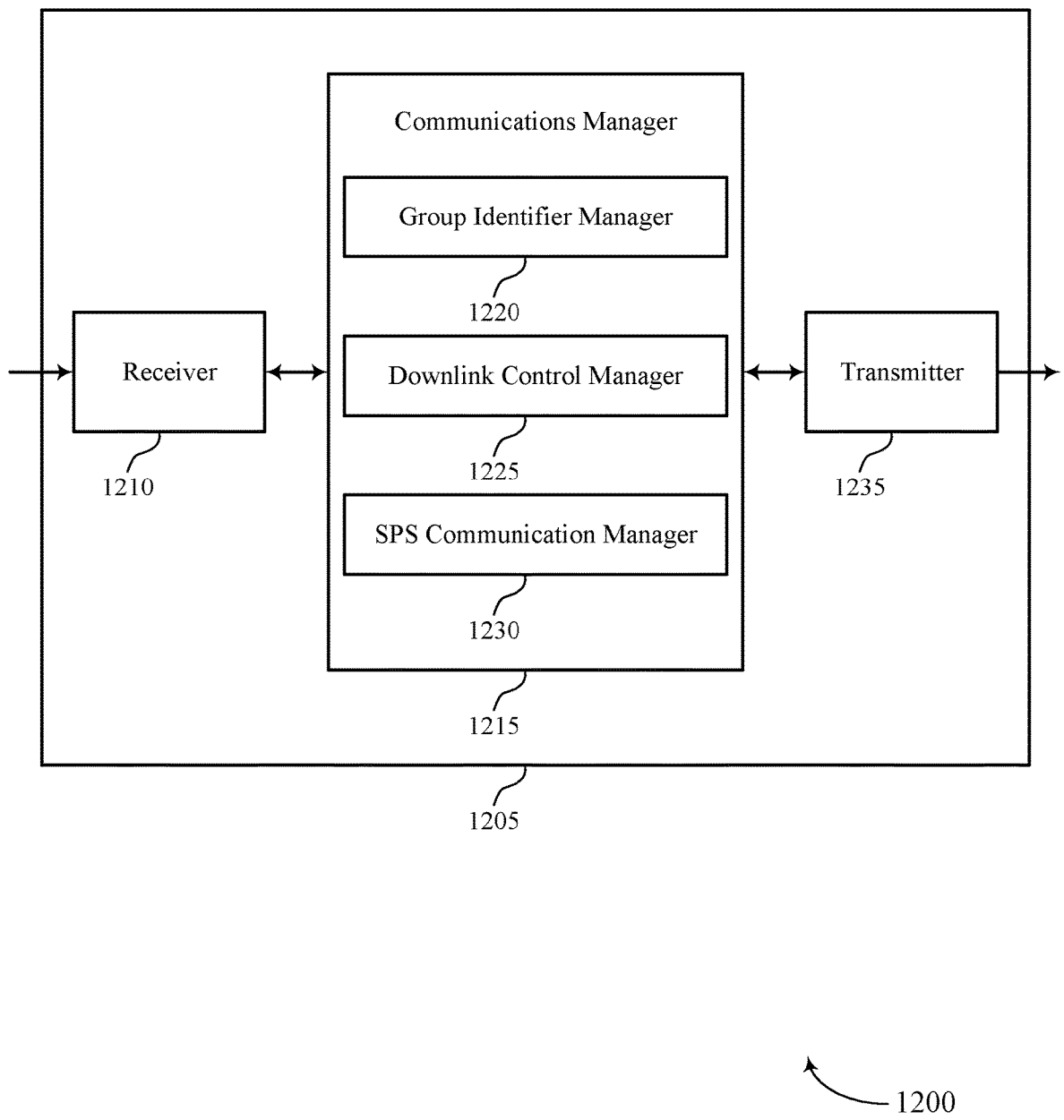

FIG. 12 shows a block diagram 1200 of a device 1205 that supports user equipment groups for group physical downlink control channel communications in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to user equipment groups for group physical downlink control channel communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a group identifier manager 1220, a downlink control manager 1225, and a SPS communication manager 1230. The communications manager 1215 may be an example of aspects of the communications manager 1410 described herein.

The group identifier manager 1220 may transmit, via a configuration message, a group identifier indicating a group of UEs with which a UE is associated, the group of UEs being one of multiple groups of UEs which are each allocated resources.

The downlink control manager 1225 may encode at least a part of a group downlink control information message with the group identifier and transmit the group downlink control information message to the group of UEs.

The SPS communication manager 1230 may communicate with the UE in accordance with the group downlink control information message based on the UE being associated with the group to which the group downlink control information message pertains.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
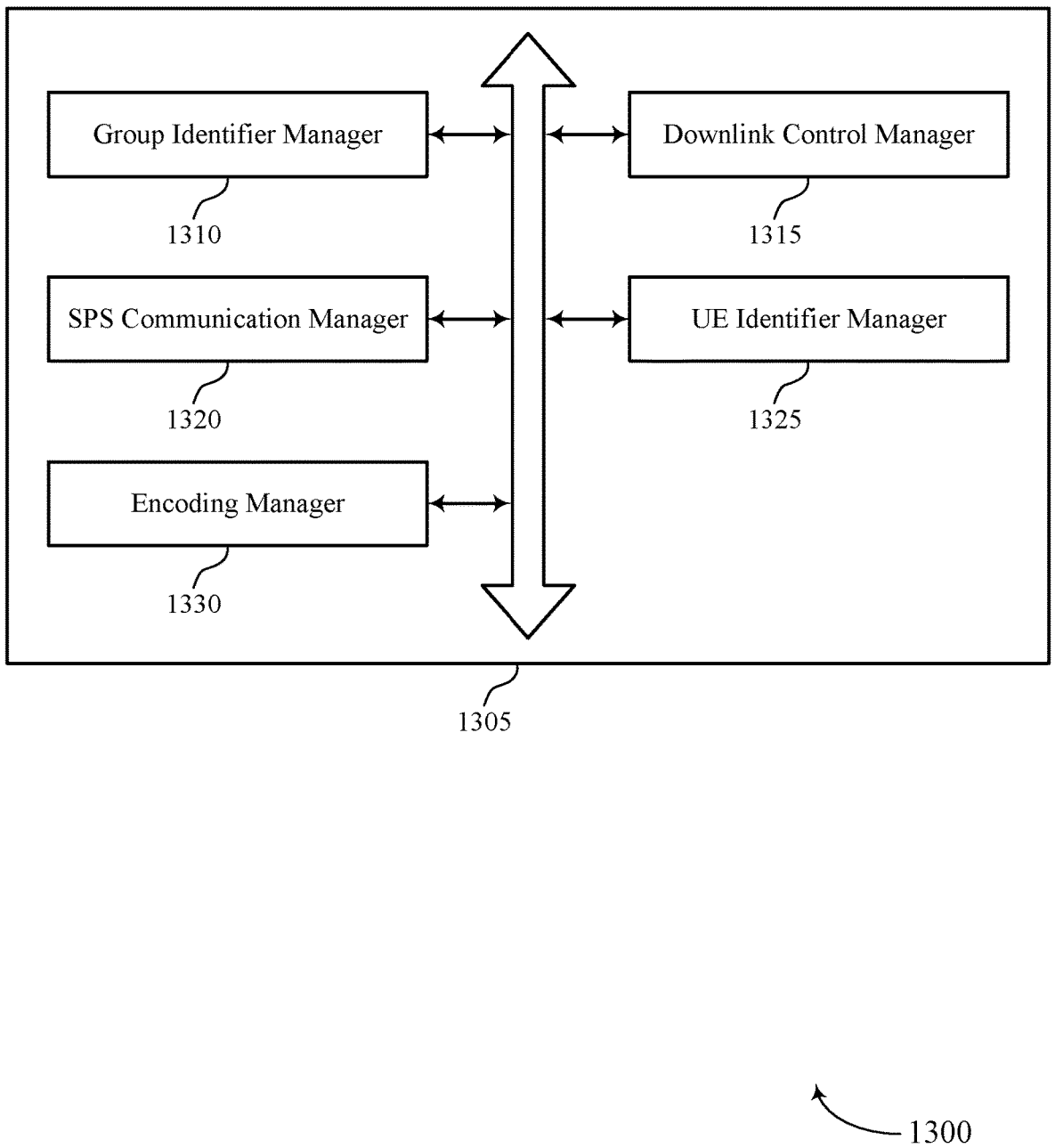
FIG. 13 shows a block diagram of a communications manager that supports user equipment groups for group physical downlink control channel communications in accordance with aspects of the present disclosure.

FIG. 13 shows a block diagram 1300 of a communications manager 1305 that supports user equipment groups for group physical downlink control channel communications in accordance with aspects of the present disclosure. The communications manager 1305 may be an example of aspects of a communications manager 1115, a communications manager 1215, or a communications manager 1410 described herein. The communications manager 1305 may include a group identifier manager 1310, a downlink control manager 1315, a SPS communication manager 1320, a UE identifier manager 1325, and an encoding manager 1330. Each of these modules may communicate, directly or indirectly, with one another (e.g., via one or more buses).

The group identifier manager 1310 may transmit, via a configuration message, a group identifier indicating a group of UEs with which a UE is associated, the group of UEs being one of multiple groups of UEs which are each allocated resources.

In some examples, the group identifier manager 1310 may transmit, via the configuration message, a set of group identifiers, each of the set of group identifiers being associated with different types of resource allocations that could be included in the group downlink control information message. In some examples, the group identifier manager 1310 may transmit an additional configuration message that includes a new group identifier indicating a new group of UEs with which the UE is associated.

In some examples, the group identifier manager 1310 may transmit a MAC CE message that indicates a new group identifier, the new group identifier indicating a new group of UEs with which the UE is associated. In some examples, the group identifier manager 1310 may transmit a set of additional group identifiers in either the configuration message or an additional configuration message.

The downlink control manager 1315 may encode at least a part of a group downlink control information message with the group identifier.

In some examples, the downlink control manager 1315 may transmit the group downlink control information message to the group of UEs. In some examples, the downlink control manager 1315 may transmit one or more unicast downlink control information messages pertaining to the UE when the UE is no longer associated with the group and before the UE is associated with a new group of UEs.

In some examples, the downlink control manager 1315 may transmit an additional downlink control information message that indicates that the UE is to be associated with a new group identifier of the additional group identifiers. In some examples, the downlink control manager 1315 may transmit a unicast downlink control information message pertaining to the UE instead of a group downlink control information message when a number of UEs within the group of UEs to receive updated downlink control information is below a threshold.

The SPS communication manager 1320 may communicate with the UE in accordance with the group downlink control information message based on the UE being associated with the group to which the group downlink control information message pertains.

The UE identifier manager 1325 may transmit, via the configuration message, a UE identifier associated with the UE, where the UE identifier is based on either a number of UEs in the group of UEs or a number of UEs in a cell serving the group of UEs.

The encoding manager 1330 may encode, by the group identifier, a CRC value of the group downlink control information message.

Figure 14:
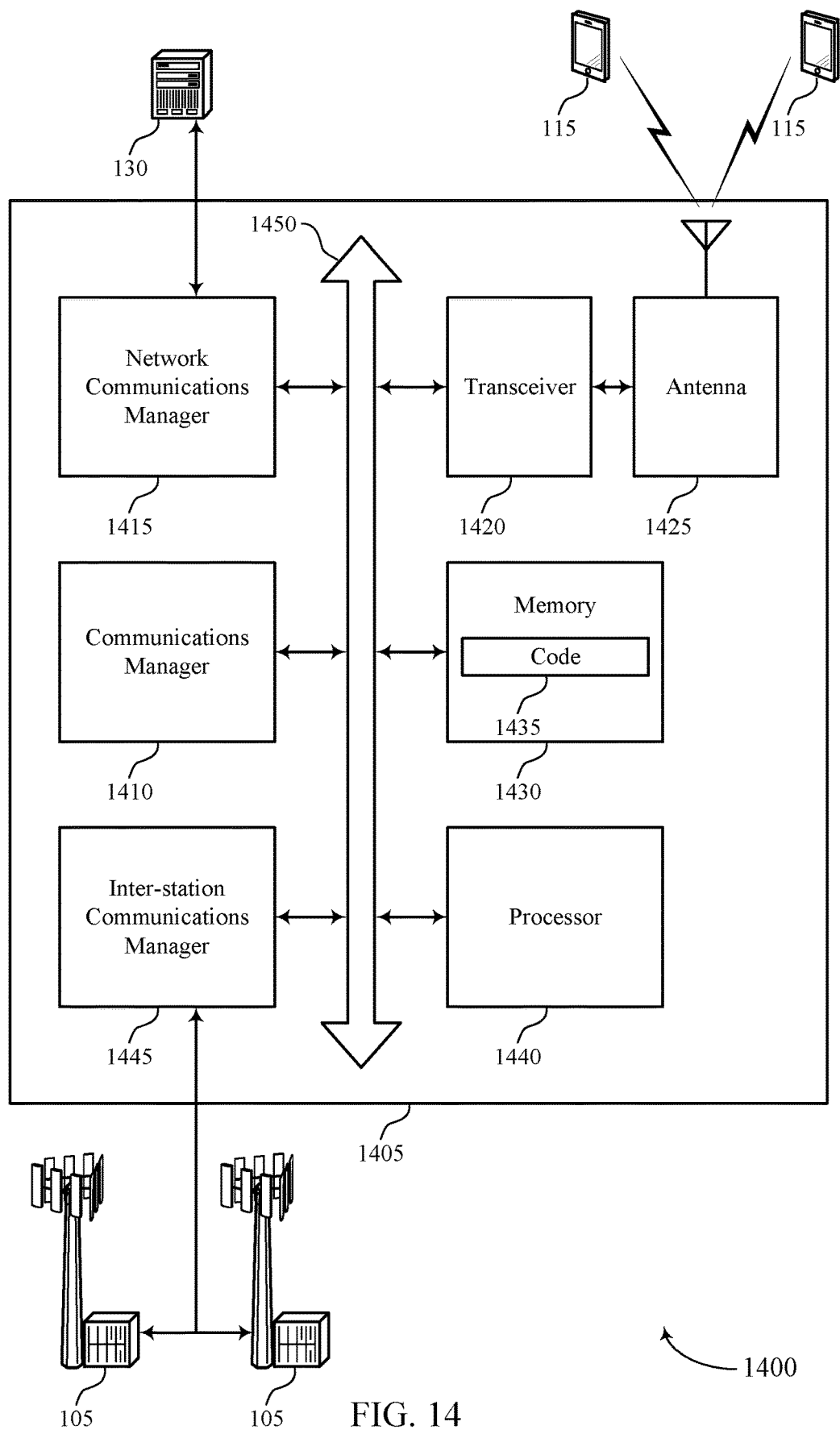
FIG. 14 shows a diagram of a system including a device that supports user equipment groups for group physical downlink control channel communications in accordance with aspects of the present disclosure.

FIG. 14 shows a diagram of a system 1400 including a device 1405 that supports user equipment groups for group physical downlink control channel communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, via a configuration message, a group identifier indicating a group of UEs with which a UE is associated, the group of UEs being one of multiple groups of UEs which are each allocated resources, and encode at least a part of a group downlink control information message with the group identifier. The communications manager 1410 may also transmit the group downlink control information message to the group of UEs, and communicate with the UE in accordance with the group downlink control information message based on the UE being associated with the group to which the group downlink control information message pertains.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting user equipment groups for group physical downlink control channel communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communication. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
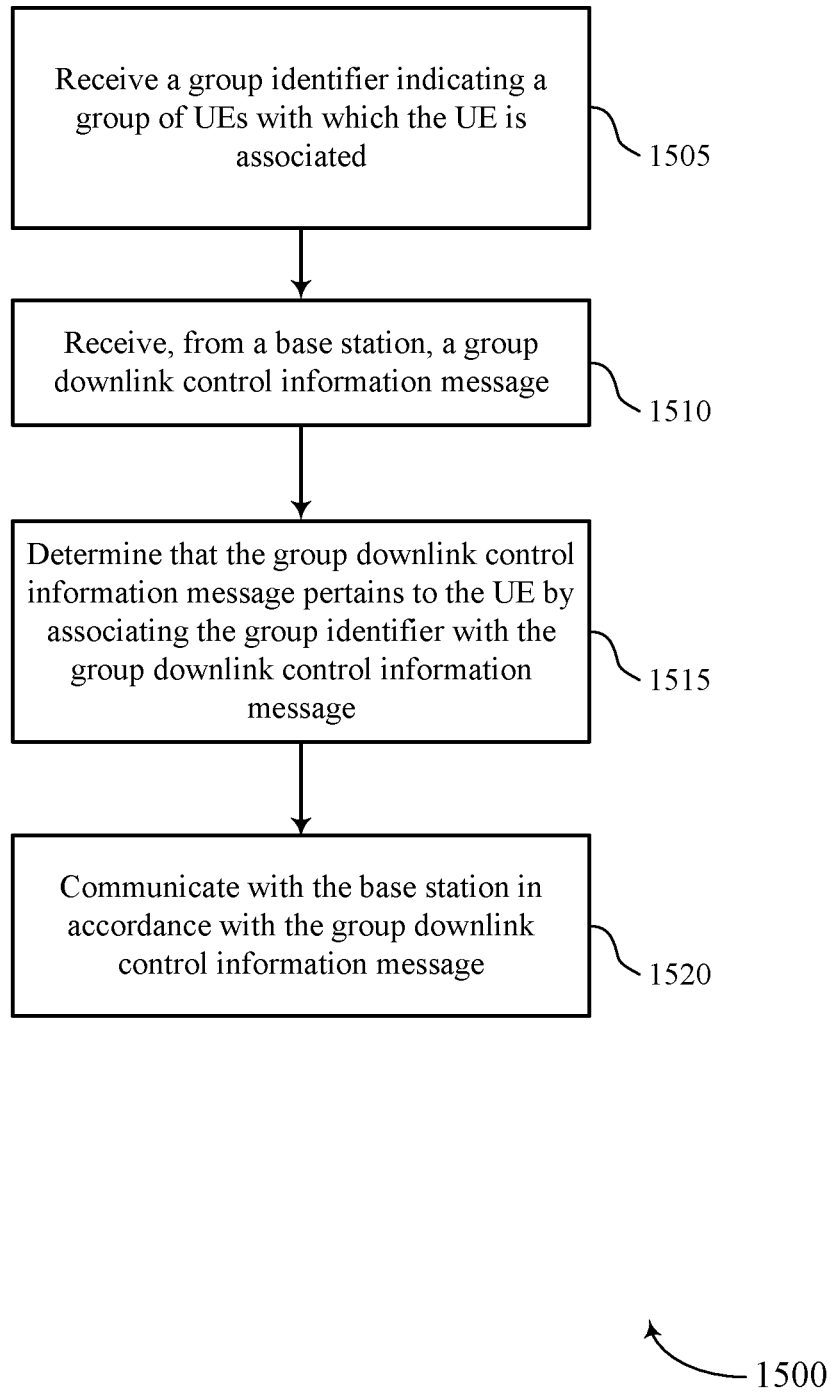
FIGS. 15 through 18 show flowcharts illustrating methods that support user equipment groups for group physical downlink control channel communications in accordance with aspects of the present disclosure.

FIG. 15 shows a flowchart illustrating a method 1500 that supports user equipment groups for group physical downlink control channel communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive a group identifier indicating a group of UEs with which the UE is associated. The group of UEs may be one of multiple groups of UEs which are each allocated resources. In some cases, the group identifier is received in a configuration message. The operations of 1505 may be performed according to the methods described herein. In some examples, aspects of the operations of 1505 may be performed by a Group Identifier Manager as described with reference to FIGS. 7 through 10.

At 1510, the UE may receive, from a base station, a group downlink control information message. The operations of 1510 may be performed according to the methods described herein. In some examples, aspects of the operations of 1510 may be performed by a Downlink Control Manager as described with reference to FIGS. 7 through 10.

At 1515, the UE may determine that the group downlink control information message pertains to the UE by associating the group identifier with the group downlink control information message. The operations of 1515 may be performed according to the methods described herein. In some examples, aspects of the operations of 1515 may be performed by a Group Identifier Manager as described with reference to FIGS. 7 through 10.

At 1520, the UE may communicate with the base station in accordance with the group downlink control information message. The communication may be based on the UE being associated with the group to which the group downlink control information message pertains. The operations of 1520 may be performed according to the methods described herein. In some examples, aspects of the operations of 1520 may be performed by a SPS Communication Manager as described with reference to FIGS. 7 through 10. When utilizing group physical downlink control channel communications, a base station may group one or more UEs such that the UEs of the group share similar characteristics such as channel conditions, aggregation level, MCS, etc. Grouping UEs in this manner and providing control information to the group as a whole may allow for a more efficient and lower latency system than the case if each UE were provided its own resources or if all UEs in a serving cell were provided resources in a single group control information message.

Figure 16:
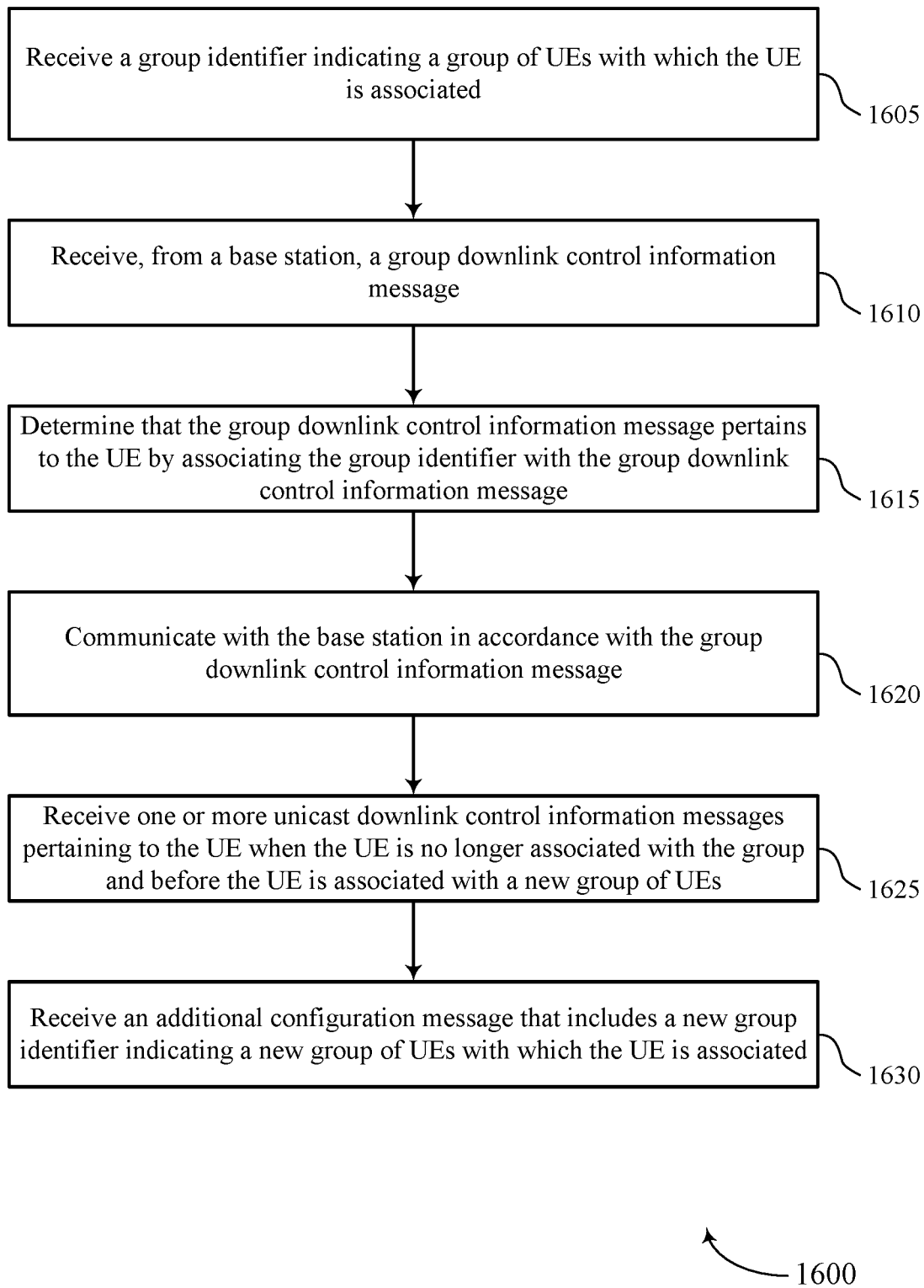

FIG. 16 shows a flowchart illustrating a method 1600 that supports user equipment groups for group physical downlink control channel communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive a group identifier indicating a group of UEs with which the UE is associated. The group of UEs may be one of multiple groups of UEs which are each allocated resources. In some aspects, the multiple groups of UEs may each be allocated the resources based on aggregation levels associated with UEs included in the multiple groups of UEs. In some cases, the group identifier is received in a configuration message. The operations of 1605 may be performed according to the methods described herein. In some examples, aspects of the operations of 1605 may be performed by a Group Identifier Manager as described with reference to FIGS. 7 through 10.

At 1610, the UE may receive, from a base station, a group downlink control information message. In some aspects, the group downlink control information message may include multiplexed UE-specific information for one or more of UEs within the group of UEs. The operations of 1610 may be performed according to the methods described herein. In some examples, aspects of the operations of 1610 may be performed by a Downlink Control Manager as described with reference to FIGS. 7 through 10.

At 1615, the UE may determine that the group downlink control information message pertains to the UE by associating the group identifier with the group downlink control information message. The operations of 1615 may be performed according to the methods described herein. In some examples, aspects of the operations of 1615 may be performed by a Group Identifier Manager as described with reference to FIGS. 7 through 10.

At 1620, the UE may communicate with the base station in accordance with the group downlink control information message. The communication may be based on the UE being associated with the group to which the group downlink control information message pertains. The operations of 1620 may be performed according to the methods described herein. In some examples, aspects of the operations of 1620 may be performed by a SPS Communication Manager as described with reference to FIGS. 7 through 10.

At 1625, the UE may receive one or more unicast downlink control information messages pertaining to the UE when the UE is no longer associated with the group and before the UE is associated with a new group of UEs. The operations of 1625 may be performed according to the methods described herein. In some examples, aspects of the operations of 1625 may be performed by a Downlink Control Manager as described with reference to FIGS. 7 through 10.

At 1630, the UE may receive an additional configuration message that includes a new group identifier indicating a new group of UEs with which the UE is associated. The operations of 1630 may be performed according to the methods described herein. In some examples, aspects of the operations of 1630 may be performed by a Group Identifier Manager as described with reference to FIGS. 7 through 10. In addition to providing control information to the group as a whole in a first group downlink control information message, channel conditions may change for one or more UEs of the group. When this occurs, a base station may dynamically determine new UE groupings for the one or more UEs of the group. The new UE groupings may better share similar characteristics such as channel conditions, aggregation level, MCS, etc., after the base station has detected that one or more conditions have changed. Grouping UEs in this manner and providing new control information to the new group may allow for a more efficient and lower latency system than a previous UE group formed under previous conditions.

Figure 17:
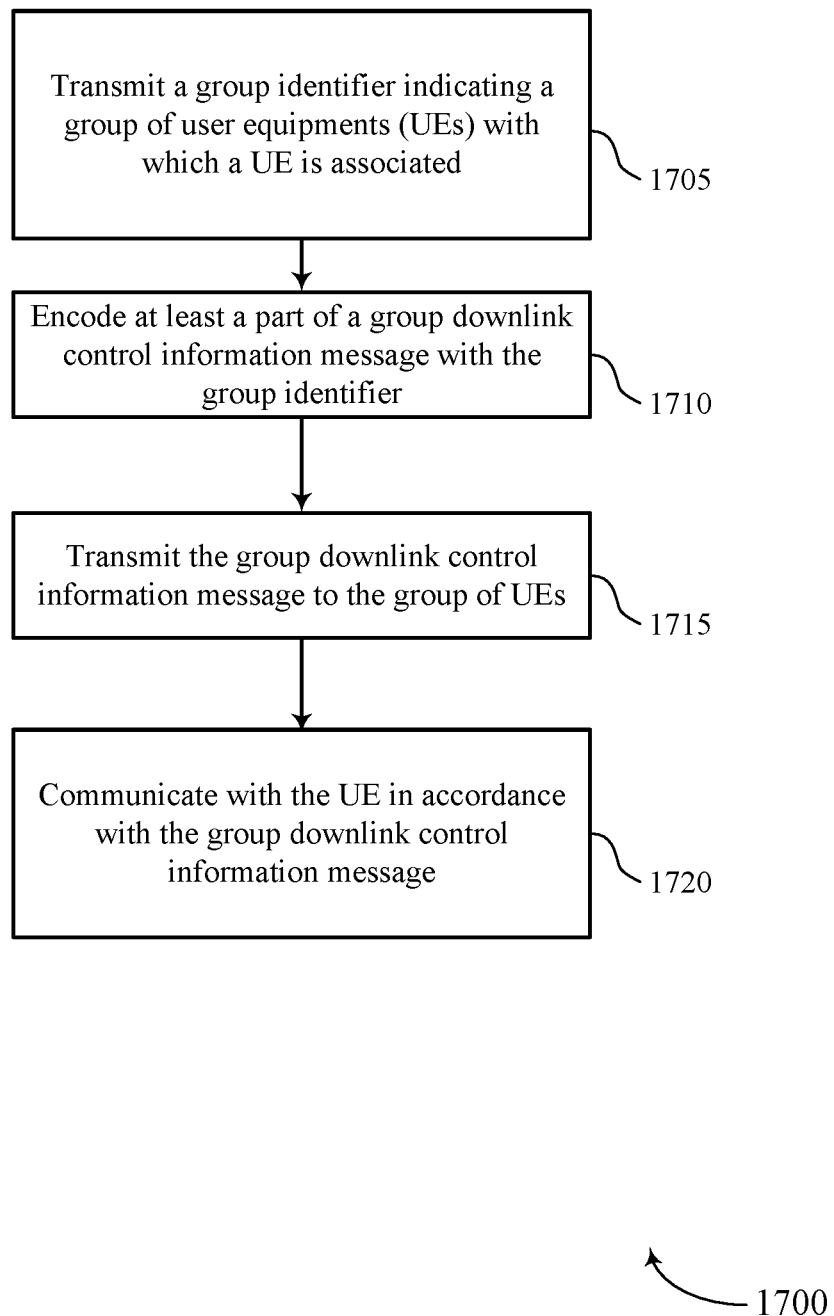

FIG. 17 shows a flowchart illustrating a method 1700 that supports user equipment groups for group physical downlink control channel communications in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may transmit a group identifier indicating a group of UEs with which a UE is associated. The group of UEs may be one of multiple groups of UEs which are each allocated resources. In some cases, the group identifier is transmitted in a configuration message. The operations of 1705 may be performed according to the methods described herein. In some examples, aspects of the operations of 1705 may be performed by a Group Identifier Manager as described with reference to FIGS. 11 through 14.

At 1710, the base station may encode at least a part of a group downlink control information message with the group identifier. The operations of 1710 may be performed according to the methods described herein. In some examples, aspects of the operations of 1710 may be performed by a Downlink Control Manager as described with reference to FIGS. 11 through 14.

At 1715, the base station may transmit the group downlink control information message to the group of UEs. The operations of 1715 may be performed according to the methods described herein. In some examples, aspects of the operations of 1715 may be performed by a Downlink Control Manager as described with reference to FIGS. 11 through 14.

At 1720, the base station may communicate with the UE in accordance with the group downlink control information message. The communication may be based on the UE being associated with the group to which the group downlink control information message pertains. The operations of 1720 may be performed according to the methods described herein. In some examples, aspects of the operations of 1720 may be performed by a SPS Communication Manager as described with reference to FIGS. 11 through 14. When utilizing group physical downlink control channel communications, a base station may group one or more UEs such that the UEs of the group share similar characteristics such as channel conditions, aggregation level, MCS, etc. Grouping UEs in this manner and providing control information to the group as a whole may allow for a more efficient and lower latency system than the case if each UE were provided its own resources or if all UEs in a serving cell were provided resources in a single group control information message.

Figure 18:
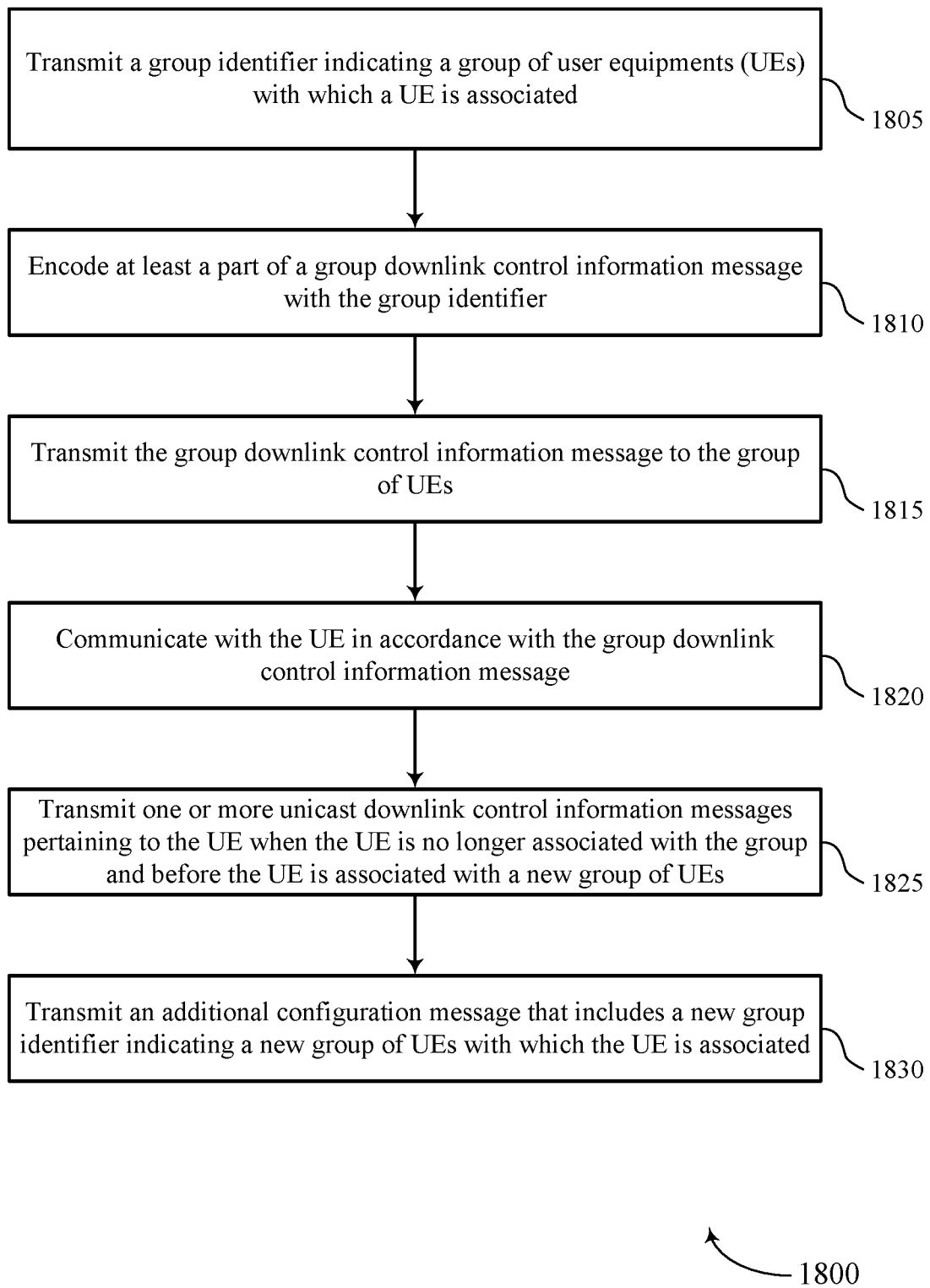

FIG. 18 shows a flowchart illustrating a method 1800 that supports user equipment groups for group physical downlink control channel communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may transmit a group identifier indicating a group of UEs with which a UE is associated. The group of UEs may be one of multiple groups of UEs which are each allocated resources. In some aspects, the multiple groups of UEs may each be allocated the resources based on aggregation levels associated with UEs included in the multiple groups of UEs. The operations of 1805 may be performed according to the methods described herein. In some examples, aspects of the operations of 1805 may be performed by a Group Identifier Manager as described with reference to FIGS. 11 through 14.

At 1810, the base station may encode at least a part of a group downlink control information message with the group identifier. The operations of 1810 may be performed according to the methods described herein. In some examples, aspects of the operations of 1810 may be performed by a Downlink Control Manager as described with reference to FIGS. 11 through 14.

At 1815, the base station may transmit the group downlink control information message to the group of UEs. In some aspects, the group downlink control information message may include multiplexed UE-specific information for one or more of UEs within the group of UEs. The operations of 1815 may be performed according to the methods described herein. In some examples, aspects of the operations of 1815 may be performed by a Downlink Control Manager as described with reference to FIGS. 11 through 14.

At 1820, the base station may communicate with the UE in accordance with the group downlink control information message. The communication may be based on the UE being associated with the group to which the group downlink control information message pertains. The operations of 1820 may be performed according to the methods described herein. In some examples, aspects of the operations of 1820 may be performed by a SPS Communication Manager as described with reference to FIGS. 11 through 14.

At 1825, the base station may transmit one or more unicast downlink control information messages pertaining to the UE when the UE is no longer associated with the group and before the UE is associated with a new group of UEs. The operations of 1825 may be performed according to the methods described herein. In some examples, aspects of the operations of 1825 may be performed by a Downlink Control Manager as described with reference to FIGS. 11 through 14.

At 1830, the base station may transmit an additional configuration message that includes a new group identifier indicating a new group of UEs with which the UE is associated. The operations of 1830 may be performed according to the methods described herein. In some examples, aspects of the operations of 1830 may be performed by a Group Identifier Manager as described with reference to FIGS. 11 through 14. In addition to providing control information to the group as a whole in a first group downlink control information message, channel conditions may change for one or more UEs of the group. When this occurs, a base station may dynamically determine new UE groupings for the one or more UEs of the group. The new UE groupings may better share similar characteristics such as channel conditions, aggregation level, MCS, etc., after the base station has detected that one or more conditions have changed. Grouping UEs in this manner and providing new control information to the new group may allow for a more efficient and lower latency system than a previous UE group formed under previous conditions.

It should be noted that the methods described herein describe possible implementations, and that the operations and the steps may be rearranged or otherwise modified and that other implementations are possible. Further, aspects from two or more of the methods may be combined.

The following provides an overview of further embodiments of the present invention:

Embodiment 1: A method for wireless communication at a UE, comprising: receiving, via a configuration message, a group identifier indicating a group of UEs with which the UE is associated, the group of UEs being one of multiple groups of UEs which are each allocated resources; receiving, from a base station, a group downlink control information message; determining that the group downlink control information message pertains to the UE by associating the group identifier with the group downlink control information message; and communicating with the base station in accordance with the group downlink control information message based at least in part on the UE being associated with the group to which the group downlink control information message pertains.

Embodiment 2: The method of embodiment 1, wherein the multiple groups of UEs are each allocated the resources based at least in part on aggregation levels associated with UEs included in the multiple groups of UEs.

Embodiment 3: The method of any of embodiments 1 and 2, wherein the group downlink control information message includes multiplexed UE-specific information for one or more of UEs within the group of UEs.

Embodiment 4: The method of any of embodiments 1 to 3, wherein the group of

UEs are grouped by the group identifier based at least in part on each of the UEs of the group of UEs sharing a common aggregation level for individual downlink control information messages.

Embodiment 5: The method of any of embodiments 1 to 4, wherein other UEs are grouped in the multiple groups by corresponding other group identifiers, with only one group per common aggregation level.

Embodiment 6: The method of any of embodiments 1 to 4, wherein other UEs are grouped in the multiple groups by corresponding other group identifiers, with one or more groups per common aggregation level, wherein groups associated with a same common aggregation level are differentiated by being associated with different modulation and coding schemes.

Embodiment 7: The method of any of embodiments 1 to 6, further comprising receiving, via the configuration message, a UE identifier associated with the UE, wherein the UE identifier is based at least in part on either a number of UEs in the group of UEs or a number of UEs in a cell serving the group of UEs.

Embodiment 8: The method of any of embodiments 1 to 7, wherein receiving the group identifier comprises: receiving, via the configuration message, a plurality of group identifiers, each of the plurality of group identifiers being associated with different types of resource allocations that could be included in the group downlink control information message.

Embodiment 9: The method of any of embodiments 1 to 8, wherein determining that the group downlink control information message pertains to the UE comprises: determining that a CRC value of the group downlink control information message is encoded by the group identifier.

Embodiment 10: The method of any of embodiments 1 to 9, further comprising:

receiving one or more unicast downlink control information messages pertaining to the UE when the UE is no longer associated with the group and before the UE is associated with a new group of UEs.

Embodiment 11: The method of any of embodiments 1 to 10, further comprising: receiving an additional configuration message that includes a new group identifier indicating a new group of UEs with which the UE is associated.

Embodiment 12: The method of any of embodiments 1 to 11, further comprising: receiving a MAC CE message that indicates a new group identifier, the new group identifier indicating a new group of UEs with which the UE is associated.

Embodiment 13: The method of any of embodiments 1 to 12, further comprising:

receiving a plurality of additional group identifiers in either the configuration message or an additional configuration message; and receiving an additional downlink control information message that indicates that the UE is to be associated with a new group identifier of the additional group identifiers.

Embodiment 14: The method of any of embodiments 1 to 13, wherein the additional downlink control information message allocates resources during a same time slot for a group of UEs indicated by the new group identifier.

Embodiment 15: The method of any of embodiments 1 to 14, further comprising: receiving a second additional downlink control information message associated with the new group identifier, wherein the additional downlink control information message allocates resources during a time slot for a subset of a group of UEs indicated by the new group identifier, and wherein the second additional downlink control information message allocates resources during a second time slot for a second subset of the group of UEs indicated by the new group identifier.

Embodiment 16: The method of any of embodiments 1 to 15, further comprising: receiving a unicast downlink control information message pertaining to the UE instead of a group downlink control information message when a number of UEs within the group of UEs to receive updated downlink control information is below a threshold.

Embodiment 17: The method of any of embodiments 1 to 16, wherein the threshold is a based at least in part on a size of the group downlink control information message divided by a size of an individual downlink control information message.

Embodiment 18: The method of any of embodiments 1 to 17, wherein the group of UEs are grouped by the group identifier based at least in part on downlink channel conditions, a number of the multiple groups of UEs, a timing of semi-persistent scheduled (SPS) updates for each UE, or combinations thereof.

Embodiment 19: The method of any of embodiments 1 to 18, wherein the group identifier is a group radio network temporary identifier (G-RNTI).

Embodiment 20: The method of any of embodiments 1 to 19, wherein the configuration message is an RRC message.

Embodiment 21: A method for wireless communication at a base station, comprising: transmitting, via a configuration message, a group identifier indicating a group of UEs with which a UE is associated, the group of UEs being one of multiple groups of UEs which are each allocated resources; encoding at least a part of a group downlink control information message with the group identifier; transmitting the group downlink control information message to the group of UEs; and communicating with the UE in accordance with the group downlink control information message based at least in part on the UE being associated with the group to which the group downlink control information message pertains.

Embodiment 22: The method of embodiment 21, wherein the multiple groups of UEs are each allocated the resources based at least in part on aggregation levels associated with UEs included in the multiple groups of UEs.

Embodiment 23: The method of any of embodiments 21 and 22, wherein transmitting the group downlink control information message to the group of UEs further comprises including multiplexed UE-specific information for one or more of UEs within the group of UEs.

Embodiment 24: The method of any of embodiments 21 to 23, wherein the group of UEs are grouped by the group identifier based at least in part on each of the UEs of the group of UEs sharing a common aggregation level for individual downlink control information messages.

Embodiment 25: The method of any of embodiments 21 to 24, wherein: other UEs are grouped in the multiple groups by corresponding other group identifiers, with only one group per common aggregation level.

Embodiment 26: The method of any of embodiments 21 to 24, wherein: other UEs are grouped in the multiple groups by corresponding other group identifiers, with one or more groups per common aggregation level, wherein groups associated with a same common aggregation level are differentiated by being associated with different modulation and coding schemes.

Embodiment 27: The method of any of embodiments 21 to 26, further comprising: transmitting, via the configuration message, a UE identifier associated with the UE, wherein the UE identifier is based at least in part on either a number of UEs in the group of UEs or a number of UEs in a cell serving the group of UEs.

Embodiment 28: The method of any of embodiments 21 to 27, wherein transmitting the group identifier comprises: transmitting, via the configuration message, a plurality of group identifiers, each of the plurality of group identifiers being associated with different types of resource allocations that could be included in the group downlink control information message.

Embodiment 29: The method of any of embodiments 21 to 28, wherein encoding at least a part of the group downlink control information message with the group identifier comprises: encoding, by the group identifier, a CRC value of the group downlink control information message.

Embodiment 30: The method of any of embodiments 21 to 29, further comprising: transmitting one or more unicast downlink control information messages pertaining to the UE when the UE is no longer associated with the group and before the UE is associated with a new group of UEs.

Embodiment 31: The method of any of embodiments 21 to 30, further comprising: transmitting an additional configuration message that includes a new group identifier indicating a new group of UEs with which the UE is associated.

Embodiment 32: The method of any of embodiments 21 to 31, further comprising: transmitting a MAC CE message that indicates a new group identifier, the new group identifier indicating a new group of UEs with which the UE is associated.

Embodiment 33: The method of any of embodiments 21 to 32, further comprising: transmitting a plurality of additional group identifiers in either the configuration message or an additional configuration message; and transmitting an additional downlink control information message that indicates that the UE is to be associated with a new group identifier of the additional group identifiers.

Embodiment 34: The method of any of embodiments 21 to 33, wherein the additional downlink control information message allocates resources during a same time slot for a group of UEs indicated by the new group identifier.

Embodiment 35: The method of any of embodiments 21 to 34, further comprising:

transmitting a second additional downlink control information message associated with the new group identifier, wherein the additional downlink control information message allocates resources during a time slot for a subset of a group of UEs indicated by the new group identifier, and wherein the second additional downlink control information message allocates resources during a second time slot for a second subset of the group of UEs indicated by the new group identifier.

Embodiment 36: The method of any of embodiments 21 to 35, further comprising: transmitting a unicast downlink control information message pertaining to the UE instead of a group downlink control information message when a number of UEs within the group of UEs to receive updated downlink control information is below a threshold.

Embodiment 37: The method of any of embodiments 21 to 36, wherein the threshold is a based at least in part on a size of the group downlink control information message divided by a size of an individual downlink control information message.

Embodiment 38: The method of any of embodiments 21 to 37, wherein the group of UEs are grouped by the group identifier based at least in part on downlink channel conditions, a number of the multiple groups of UEs, a timing of semi-persistent scheduled (SPS) updates for each UE, or combinations thereof.

Embodiment 39: The method of any of embodiments 21 to 38, wherein the group identifier is a group radio network temporary identifier (G-RNTI).

Embodiment 40: The method of any of embodiments 21 to 39, wherein the configuration message is an RRC message.

Embodiment 41: An apparatus comprising at least one means for performing a method of any of embodiments 1 to 20.

Embodiment 42: An apparatus for wireless communications comprising a processor; memory in electronic communication with the processor; and instructions stored in the memory and executable by the processor to cause the apparatus to perform a method of any of embodiments 1 to 20.

Embodiment 43: A non-transitory computer-readable medium storing code for wireless communications, the code comprising instructions executable by a processor to perform a method of any of embodiments 1 to 20.

Embodiment 44: An apparatus comprising at least one means for performing a method of any of embodiments 21 to 40.

Embodiment 45: An apparatus for wireless communications comprising a processor; memory in electronic communication with the processor; and instructions stored in the memory and executable by the processor to cause the apparatus to perform a method of any of embodiments 21 to 40.

Embodiment 46: A non-transitory computer-readable medium storing code for wireless communications, the code comprising instructions executable by a processor to perform a method of any of embodiments 21 to 40.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, via a configuration message, a group identifier indicating a group of UEs with which the UE is associated, the group of UEs being one of multiple groups of UEs which are each allocated resources, the multiple groups of UEs are grouped based at least in part on aggregation levels associated with UEs included in the multiple groups of UEs;
    receiving, from a base station, a group downlink control information message;
    determining that the group downlink control information message pertains to the UE by associating the group identifier with the group downlink control information message; and communicating with the base station in accordance with the group downlink control information message based at least in part on the UE being associated with the group to which the group downlink control information message pertains.

2. The method of claim 1, wherein the group downlink control information message includes multiplexed UE-specific information for one or more of UEs within the group of UEs.

3. The method of claim 1, wherein the group of UEs are grouped by the group identifier based at least in part on each of the UEs of the group of UEs sharing a common aggregation level for individual downlink control information messages.

4. The method of claim 3, wherein:
other UEs are grouped in the multiple groups by corresponding other group identifiers, with only one group per common aggregation level.

5. The method of claim 3, wherein:
other UEs are grouped in the multiple groups by corresponding other group identifiers, with one or more groups per common aggregation level, wherein groups associated with a same common aggregation level are differentiated by being associated with different modulation and coding schemes.

6. The method of claim 1, further comprising:
receiving, via the configuration message, a UE identifier associated with the UE, wherein the UE identifier is based at least in part on either a number of UEs in the group of UEs or a number of UEs in a cell serving the group of UEs.

7. The method of claim 1, wherein receiving the group identifier comprises:
receiving, via the configuration message, a plurality of group identifiers, each of the plurality of group identifiers being associated with different types of resource allocations that could be included in the group downlink control information message.

8. The method of claim 1, wherein determining that the group downlink control information message pertains to the UE comprises:
determining that a cyclic redundancy check (CRC) value of the group downlink control information message is encoded by the group identifier.

9. The method of claim 1, further comprising:
receiving one or more unicast downlink control information messages pertaining to the UE when the UE is no longer associated with the group and before the UE is associated with a new group of UEs.

10. The method of claim 9, further comprising:
receiving an additional configuration message that includes a new group identifier indicating a new group of UEs with which the UE is associated.

11. The method of claim 1, further comprising:
receiving a media access control (MAC) control element (CE) message that indicates a new group identifier, the new group identifier indicating a new group of UEs with which the UE is associated.

12. The method of claim 1, further comprising:
receiving a plurality of additional group identifiers in either the configuration message or an additional configuration message; and
receiving an additional downlink control information message that indicates that the UE is to be associated with a new group identifier of the additional group identifiers.

13. The method of claim 12, wherein the additional downlink control information message allocates resources during a same time slot for a group of UEs indicated by the new group identifier.

14. The method of claim 12, further comprising:
receiving a second additional downlink control information message associated with the new group identifier, wherein the additional downlink control information message allocates resources during a time slot for a subset of a group of UEs indicated by the new group identifier, and wherein the second additional downlink control information message allocates resources during a second time slot for a second subset of the group of UEs indicated by the new group identifier.

15. The method of claim 1, further comprising:
receiving a unicast downlink control information message pertaining to the UE instead of a group downlink control information message when a number of UEs within the group of UEs to receive updated downlink control information is below a threshold.

16. The method of claim 15, wherein the threshold is a based at least in part on a size of the group downlink control information message divided by a size of an individual downlink control information message.

17. The method of claim 1, wherein the group of UEs are grouped by the group identifier based at least in part on downlink channel conditions, a number of the multiple groups of UEs, a timing of semi-persistent scheduled (SPS) updates for each UE, or combinations thereof.

18. The method of claim 1, wherein the group identifier is a group radio network temporary identifier (G-RNTI).

19. The method of claim 1, wherein the configuration message is an radio resource control (RRC) message.

20. A method for wireless communication at a base station, comprising:
transmitting, via a configuration message, a group identifier indicating a group of user equipments (UEs) with which a UE is associated, the group of UEs being one of multiple groups of UEs which are each allocated resources, the multiple groups of UEs are grouped based at least in part on aggregation levels associated with UEs included in the multiple groups of UEs;
encoding at least a part of a group downlink control information message with the group identifier;
transmitting the group downlink control information message to the group of UEs; and
communicating with the UE in accordance with the group downlink control information message based at least in part on the UE being associated with the group to which the group downlink control information message pertains.

21. The method of claim 20, wherein transmitting the group downlink control information message to the group of UEs further comprises including multiplexed UE-specific information for one or more of UEs within the group of UEs.

22. The method of claim 20, wherein the group of UEs are grouped by the group identifier based at least in part on each of the UEs of the group of UEs sharing a common aggregation level for individual downlink control information messages.

23. The method of claim 22, wherein:
other UEs are grouped in the multiple groups by corresponding other group identifiers, with only one group per common aggregation level.

24. The method of claim 22, wherein:
other UEs are grouped in the multiple groups by corresponding other group identifiers, with one or more groups per common aggregation level, wherein groups associated with a same common aggregation level are differentiated by being associated with different modulation and coding schemes.

25. The method of claim 20, further comprising:
transmitting, via the configuration message, a UE identifier associated with the UE, wherein the UE identifier is based at least in part on either a number of UEs in the group of UEs or a number of UEs in a cell serving the group of UEs.

26. The method of claim 20, wherein transmitting the group identifier comprises:
transmitting, via the configuration message, a plurality of group identifiers, each of the plurality of group identifiers being associated with different types of resource allocations that could be included in the group downlink control information message.

27. The method of claim 20, wherein encoding at least a part of the group downlink control information message with the group identifier comprises:
encoding, by the group identifier, a cyclic redundancy check (CRC) value of the group downlink control information message.

28. The method of claim 20, further comprising:
transmitting one or more unicast downlink control information messages pertaining to the UE when the UE is no longer associated with the group and before the UE is associated with a new group of UEs.

29. The method of claim 28, further comprising:
transmitting an additional configuration message that includes a new group identifier indicating a new group of UEs with which the UE is associated.

30. The method of claim 20, further comprising:
transmitting a media access control (MAC) control element (CE) message that indicates a new group identifier, the new group identifier indicating a new group of UEs with which the UE is associated.

31. The method of claim 20, further comprising:
transmitting a plurality of additional group identifiers in either the configuration message or an additional configuration message; and
transmitting an additional downlink control information message that indicates that the UE is to be associated with a new group identifier of the additional group identifiers.

32. The method of claim 31, wherein the additional downlink control information message allocates resources during a same time slot for a group of UEs indicated by the new group identifier.

33. The method of claim 31, further comprising:
transmitting a second additional downlink control information message associated with the new group identifier, wherein the additional downlink control information message allocates resources during a time slot for a subset of a group of UEs indicated by the new group identifier, and wherein the second additional downlink control information message allocates resources during a second time slot for a second subset of the group of UEs indicated by the new group identifier.

34. The method of claim 20, further comprising:
transmitting a unicast downlink control information message pertaining to the UE instead of a group downlink control information message when a number of UEs within the group of UEs to receive updated downlink control information is below a threshold.

35. The method of claim 34, wherein the threshold is a based at least in part on a size of the group downlink control information message divided by a size of an individual downlink control information message.

36. The method of claim 20, wherein the group of UEs are grouped by the group identifier based at least in part on downlink channel conditions, a number of the multiple groups of UEs, a timing of semi-persistent scheduled (SPS) updates for each UE, or combinations thereof.

37. The method of claim 20, wherein the group identifier is a group radio network temporary identifier (G-RNTI).

38. The method of claim 20, wherein the configuration message is an radio resource control (RRC) message.

39. An apparatus for wireless communication at a user equipment (UE), comprising:
a processor,
memory in electronic communication with the processor; and
instructions stored in the memory and executable by the processor to cause the apparatus to:
receive, via a configuration message, a group identifier indicating a group of UEs with which the UE is associated, the group of UEs being one of multiple groups of UEs which are each allocated resources, the multiple groups of UEs are grouped based at least in part on aggregation levels associated with UEs included in the multiple groups of UEs;
receive, from a base station, a group downlink control information message;
determine that the group downlink control information message pertains to the UE by associating the group identifier with the group downlink control information message; and
communicate with the base station in accordance with the group downlink control information message based at least in part on the UE being associated with the group to which the group downlink control information message pertains.

40. The apparatus of claim 39, wherein the group downlink control information message includes multiplexed UE-specific information for one or more of UEs within the group of UEs.

41. An apparatus for wireless communication at a base station, comprising:
a processor,
memory in electronic communication with the processor; and
instructions stored in the memory and executable by the processor to cause the apparatus to:
transmit, via a configuration message, a group identifier indicating a group of user equipments (UEs) with which a UE is associated, the group of UEs being one of multiple groups of UEs which are each allocated resources, the multiple groups of UEs are grouped based at least in part on aggregation levels associated with UEs included in the multiple groups of UEs;
encode at least a part of a group downlink control information message with the group identifier;
transmit the group downlink control information message to the group of UEs; and
communicate with the UE in accordance with the group downlink control information message based at least in part on the UE being associated with the group to which the group downlink control information message pertains.

42. The apparatus of claim 41, wherein the instructions to transmit the group downlink control information message to the group of UEs are further executable by the processor to cause the apparatus to include multiplexed UE-specific information for one or more of UEs within the group of UEs.

43. A non-transitory computer-readable medium storing code for wireless communication at a user equipment (UE), the code comprising instructions executable by a processor to:

receive, via a configuration message, a group identifier indicating a group of UEs with which the UE is associated, the group of UEs being one of multiple groups of UEs which are each allocated resources, the multiple groups of UEs are grouped based at least in part on aggregation levels associated with UEs included in the multiple groups of UEs;

receive, from a base station, a group downlink control information message;

determine that the group downlink control information message pertains to the UE by associating the group identifier with the group downlink control information message; and communicate with the base station in accordance with the group downlink control information message based at least in part on the UE being associated with the group to which the group downlink control information message pertains.

44. A non-transitory computer-readable medium storing code for wireless communication at a base station, the code comprising instructions executable by a processor to:

transmit, via a configuration message, a group identifier indicating a group of user equipments (UEs) with which a UE is associated, the group of UEs being one of multiple groups of UEs which are each allocated resources, the multiple groups of UEs are grouped based at least in part on aggregation levels associated with UEs included in the multiple groups of UEs;

encode at least a part of a group downlink control information message with the group identifier;

transmit the group downlink control information message to the group of UEs; and communicate with the UE in accordance with the group downlink control information message based at least in part on the UE being associated with the group to which the group downlink control information message pertains.

* * * * *